United States Patent
Dong

(10) Patent No.: US 7,537,824 B2
(45) Date of Patent: May 26, 2009

(54) WET FRICTION MATERIAL WITH PITCH CARBON FIBER

(75) Inventor: Feng Dong, Rochester, MI (US)

(73) Assignee: BorgWarner, Inc., Auburn Hills, MI (US)

( * ) Notice: Subject to any disclaimer, the term of this patent is extended or adjusted under 35 U.S.C. 154(b) by 388 days.

(21) Appl. No.: 10/280,101

(22) Filed: Oct. 24, 2002

(65) Prior Publication Data

US 2004/0081813 A1 Apr. 29, 2004

(51) Int. Cl.
*D04H 1/00* (2006.01)

(52) U.S. Cl. ............... 428/292.1; 428/114; 428/280; 428/364; 428/331; 428/367; 428/252; 428/408; 442/101; 442/415; 442/417

(58) Field of Classification Search ........... 428/187, 428/199, 195.1, 201, 202, 203, 488, 111, 428/137, 196, 366, 367, 401, 422, 447.1, 428/421, 902, 447.2, 408, 143, 172, 292.1, 428/114, 364, 252, 331, 368, 280; 442/101, 442/415, 417; 523/149–159; 501/95.1, 95.2
See application file for complete search history.

(56) References Cited

U.S. PATENT DOCUMENTS

| | | | |
|---|---|---|---|
| 4,098,630 A * | 7/1978 | Morse | 156/219 |
| 4,113,894 A * | 9/1978 | Koch, II | 427/494 |
| 4,861,809 A | 8/1989 | Ogawa et al. | |
| 5,083,650 A | 1/1992 | Seiz et al. | |
| 5,259,947 A * | 11/1993 | Kalback et al. | 208/44 |
| 5,437,780 A | 8/1995 | Southard et al. | |
| 5,501,788 A | 3/1996 | Romine et al. | |
| 5,540,832 A | 7/1996 | Romino | |
| 5,540,903 A | 7/1996 | Romine | |
| 5,585,166 A | 12/1996 | Kearsey | |
| 5,648,041 A | 7/1997 | Rodgers et al. | |
| 5,707,905 A | 1/1998 | Lam et al. | |
| 5,753,018 A * | 5/1998 | Lamport et al. | 106/36 |
| 5,753,356 A | 5/1998 | Lam et al. | |
| 5,766,523 A | 6/1998 | Rodgers et al. | |
| 5,856,244 A | 1/1999 | Lam et al. | |
| 5,858,883 A | 1/1999 | Lam et al. | |
| 5,895,716 A * | 4/1999 | Fiala et al. | 428/408 |
| 5,958,507 A | 9/1999 | Lam et al. | |
| 5,965,658 A | 10/1999 | Smith et al. | |
| 5,998,307 A | 12/1999 | Lam et al. | |
| 6,001,750 A | 12/1999 | Lam | |
| 6,123,829 A | 9/2000 | Zimmerman | |
| 6,130,176 A | 10/2000 | Lam | |
| 6,323,160 B1 * | 11/2001 | Murdie et al. | 508/109 |
| 6,524,681 B1 * | 2/2003 | Seitz et al. | 428/143 |

(Continued)

OTHER PUBLICATIONS

Blanco, C.; Bermejo, H. Marsh, Menendez, R., Chemical and Physical Prperties of Carbon as Related to Brake Performance, Wear 213 (1997), pp. 1-12.

(Continued)

*Primary Examiner*—Milton I Cano
*Assistant Examiner*—Camie S Thompson
(74) *Attorney, Agent, or Firm*—Emch, Schaffer, Schaub & Porcello Co. L.P.A.

(57) ABSTRACT

A friction material includes a fibrous base material having at least one type of petroleum pitch-based carbon fiber.

26 Claims, 25 Drawing Sheets
(23 of 25 Drawing Sheet(s) Filed in Color)

U.S. PATENT DOCUMENTS 6,638,883 B2 * 10/2003 Gaffney et al. .............. 442/181
6,703,117 B2 * 3/2004 Gruber et al. ............ 428/292.1

OTHER PUBLICATIONS

Gibson, D.W. and Tacchini, G.J., Carbon/Carbon Friction Materials for Dry and Wet Brake and Clutch Applications, 40th Annual Earthmoving Industry Conference, Peoria, Illinois, Apr. 11-13, 1989.

Kearsy, A. and Wagner, D., Carbon Fiber for Wet-Friction Transmissions, Off-Highway Engineering, Feb. 1998, pp. 46-48.

Hettlinger, Jr., W.P., Newman, J.W., Krock, R.P., Boyer, D.C., Carboflex and Aerocarg—Ashland's New Low Cost Carbon Fiber and Carbonizing Products for Future Brake Applications, Society of Automotive Engineers, Inc. (1986).

* cited by examiner

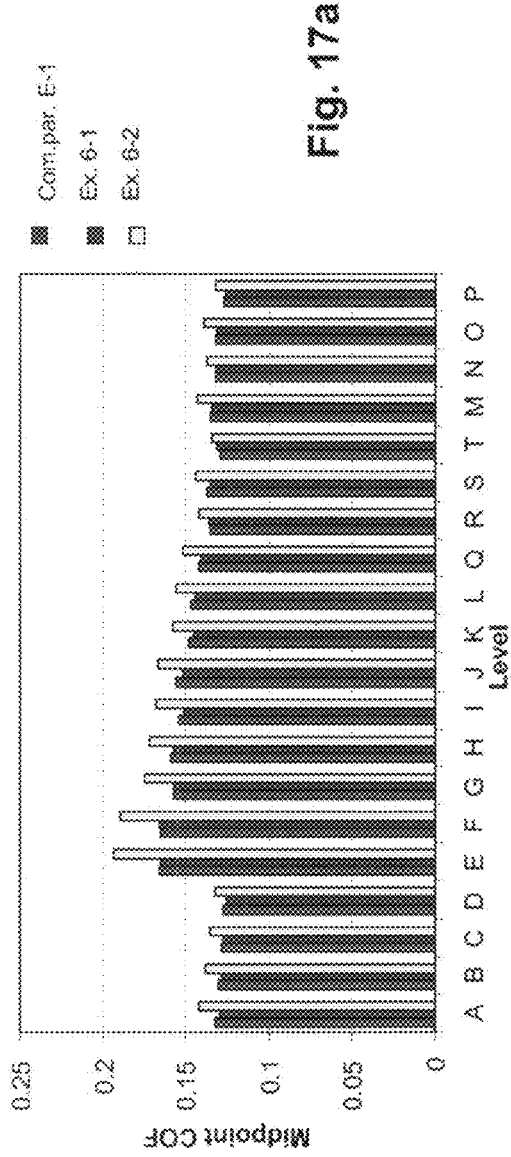
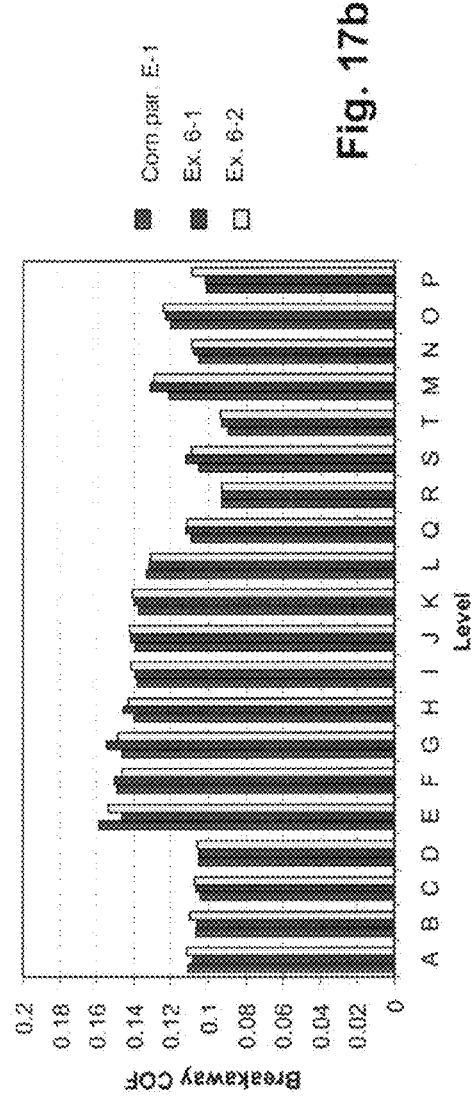

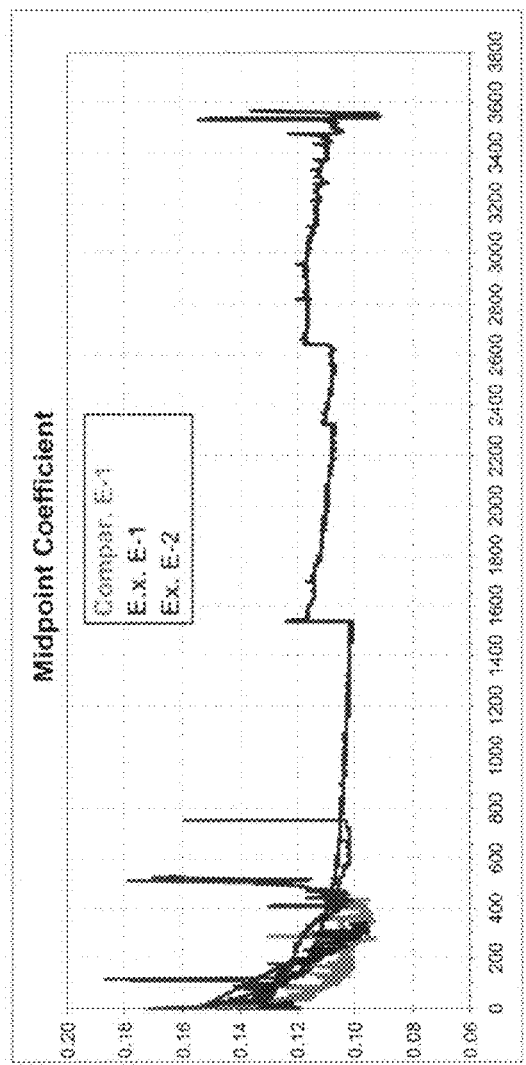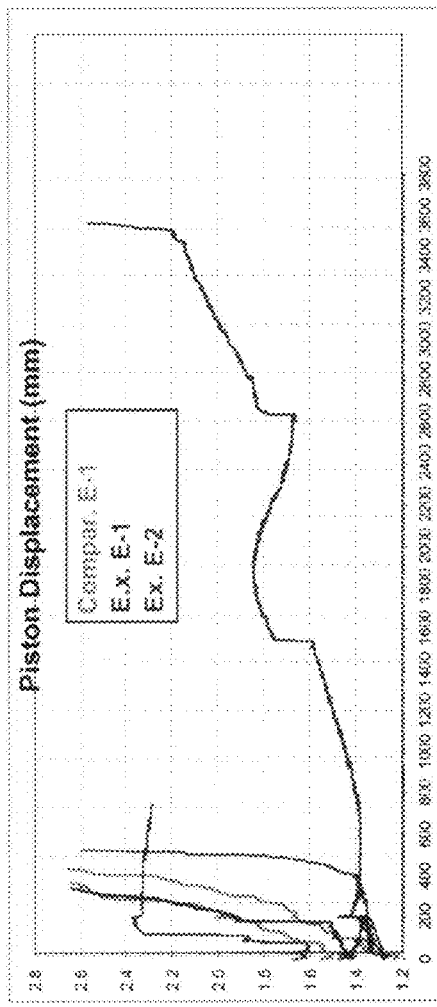

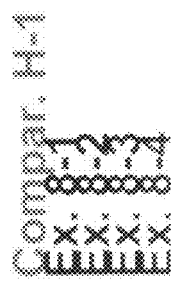
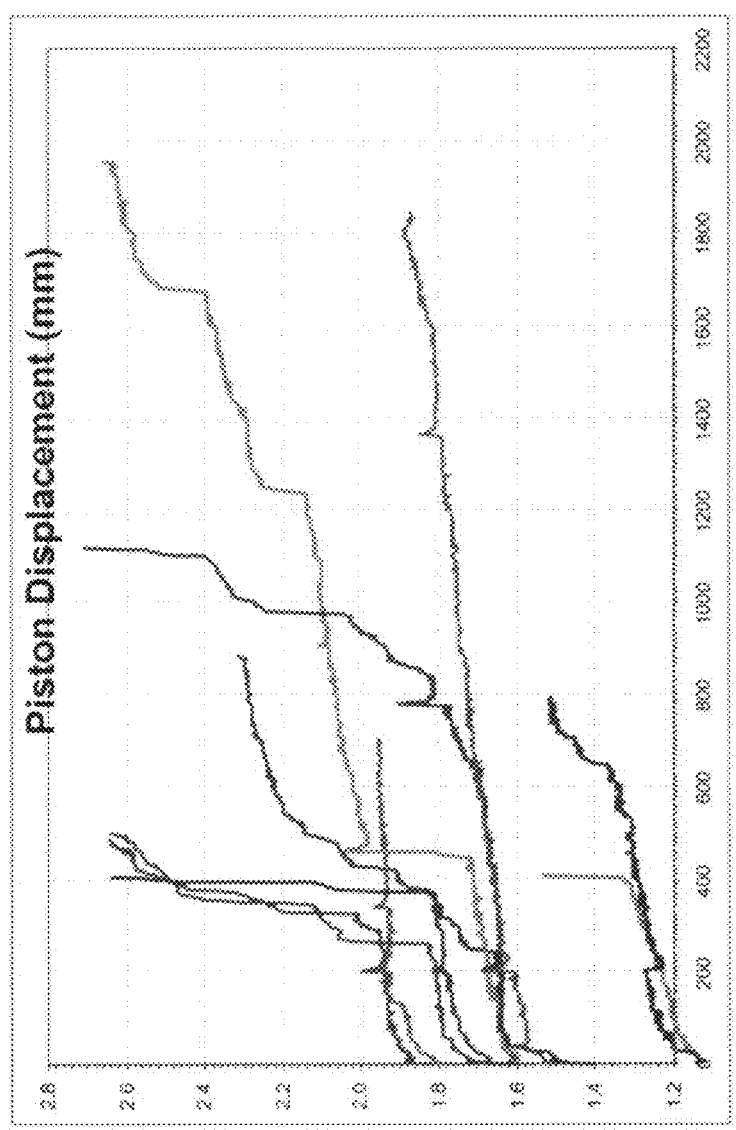
Fig. 22b

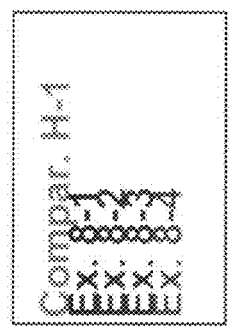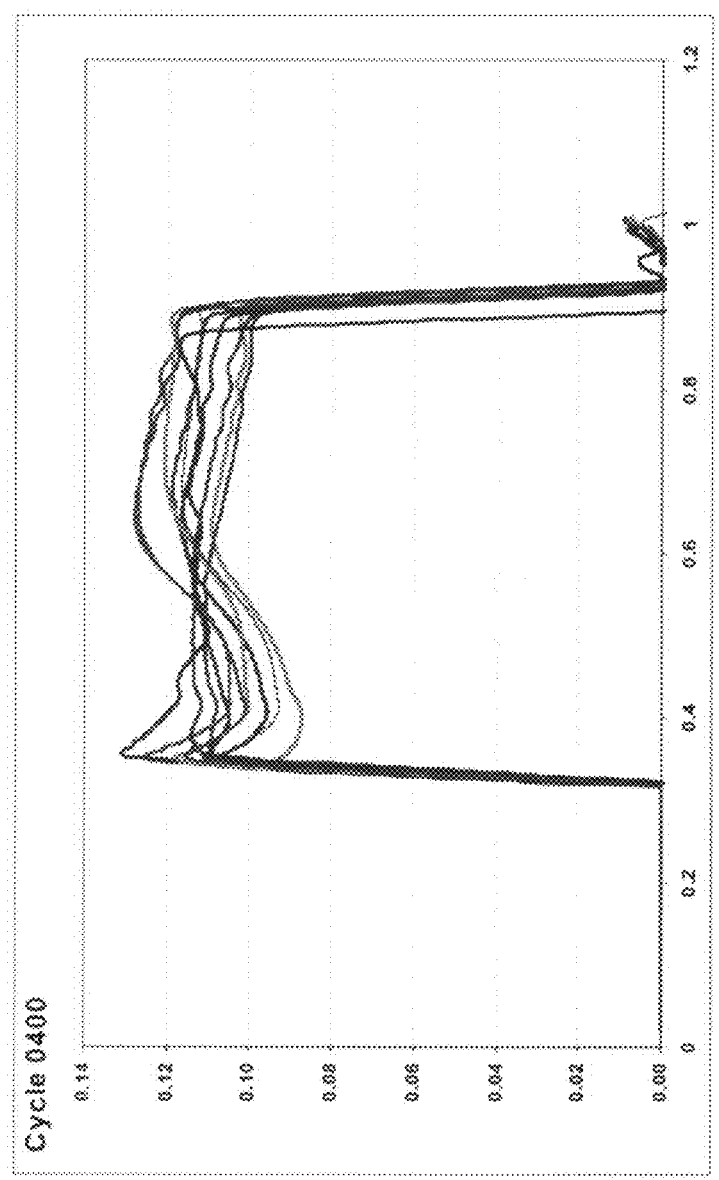
Fig. 22c

WET FRICTION MATERIAL WITH PITCH CARBON FIBER

TECHNICAL FIELD

The present invention relates to a friction material comprising a petroleum pitch based carbon fiber. The friction material of the present invention has an increased coefficient of friction of about 20% compared to standard carbon fibers. The friction material has extremely high heat resistance, improved durability and high temperature resistance.

BACKGROUND OF THE INVENTION

New and advanced continuous torque transmission systems, having continuous slip torque converters and shifting clutch systems are being developed by the automotive industry. These new systems often involve high energy requirements. Therefore, the friction materials technology must be also developed to meet the increasing energy requirements of these advanced systems.

In particular, a new high performance, durable friction material is needed. The new friction material must be able to withstand high speeds wherein surface speeds are up to about 65 m/seconds. Also, the friction material must be able to withstand high facing lining pressures up to about 1500 psi. It is also important that the friction material be useful under limited lubrication conditions.

The friction material must be durable and have high heat resistance in order to be useful in the advanced systems. Not only must the friction material remain stable at high temperatures, it must also be able to rapidly dissipate the high heat that is being generated during operating conditions.

The high speeds generated during engagement and disengagement of the new systems mean that a friction material must be able to maintain a relatively constant friction throughout the engagement periods. It is important that the frictional engagement be relatively constant over a wide range of speeds and temperatures in order to minimize "shuddering" of materials during braking or the transmission system during power shift from one gear to another. It is also important that the friction material have a desired torque curve shape so that during frictional engagement the friction material is noise or "squawk" free.

The principal performance concerns for all applications of the friction material are the prevention of shudder and the energy management of the friction interface. The occurrence of shudder can be attributed to many factors including the friction characteristics of the friction material, the mating surface's hardness and roughness, oil film retention, lubricant chemistry and interactions, clutch operating conditions, driveline assembly and hardware alignment, and driveline contamination. The friction interface energy management is primarily concerned with controlling interface temperature and is affected by the pump capacity, oil flow path and control strategy. The friction material surface design also contributes to the efficiency of interface energy management.

The main performance concerns for shifting clutch applications are the coefficient of friction characteristics of the friction material (such that the friction material has a desired torque and holding capacity) and the stability of the friction material such that the friction material does not break down under use.

Previously, asbestos fibers were included in the friction material for temperature stability. Due to health and environmental problems, asbestos is no longer being used. More recent friction materials have attempted to overcome the absence of the asbestos in the friction material by modifying impregnating paper or fiber materials with phenolic or phenolic-modified resins. These friction materials, however, do not rapidly dissipate the high heat generated, and do not have the necessary heat resistance and satisfactory high coefficient of friction performance now needed for use in the high speed systems currently being developed.

The Kearsey U.S. Pat. No. 5,585,166 describes a multi layer friction lining having a porous substrate layer (cellulose and synthetic fibers, filler and thermoset resin) and a porous friction layer (nonwoven synthetic fibers in a thermoset resin) where the friction layer has a higher porosity than the substrate layer.

The Seiz U.S. Pat. No. 5,083,650 reference involves a multi-step impregnating and curing process; i.e., a paper impregnated with a coating composition, carbon particles are placed on the paper, the coating composition in the paper is partially cured, a second coating composition is applied to the partially cured paper, and finally, both coating compositions are cured.

Various paper based fibrous materials have been developed that are co-owned by the assignee herein, BorgWarner Inc., for use in friction materials. These and all the references disclosed herein are fully incorporated herein by reference.

In particular, Lam et al., U.S. Pat. No. 5,998,307 relates to a friction material having a primary fibrous base material impregnated with a curable resin where the porous primary layer comprises at least one fibrous material and a secondary layer comprises carbon particles covering at least about 3 to about 90% of the surface of the primary layer.

The Lam et al., U.S. Pat. No. 5,858,883 relates to a base material having a primary layer of less fibrillated aramid fibers, synthetic graphite, and filler, and a secondary layer comprising carbon particles on the surface of the primary layer.

The Lam et al., U.S. Pat. No. 5,856,224 relates to a friction material comprising a base impregnated with a curable resin. The primary layer comprises less fibrillated aramid fibers, synthetic graphite and filler; the secondary layer comprises carbon particles and a retention aid.

The Lam et al. U.S. Pat. No. 5,958,507 relates to a process for producing a friction material where about 3 to about 90% of at least one surface of the fibrous material which comprises less fibrillated aramid fibers is coated with carbon particles.

The Lam, U.S. Pat. No. 6,001,750 relates to a friction material comprising a fibrous base material impregnated with a curable resin. The porous primarily layer comprises less fibrillated aramid fibers, carbon particles, carbon fibers, filler material, phenolic novoloid fibers, and optionally, cotton fibers. The secondary layer comprises carbon particles which cover the surface at about 3 to about 90% of the surface.

Yet another commonly owned patent application, Ser. No. 09/707,274 relates to a paper type friction material having a porous primary fibrous base layer with friction modifying particles covering about 3 to about 90% of the surface area of the primary layer.

In addition, various paper type fibrous base materials are described in commonly owned BorgWarner Inc. Lam et al., U.S. Pat. Nos. 5,753,356 and 5,707,905 which describe base materials comprising less fibrillated aramid fibers, synthetic graphite and filler, which references are also fully incorporated herein by reference.

Another commonly owned patent, the Lam, U.S. Pat. No. 6,130,176, relates to non-metallic paper type fibrous base materials comprising less fibrillated aramid fibers, carbon fibers, carbon particles and filler.

While self-stabilizing pitch and carbon fibers made therefrom have been disclosed in various patents such as those assigned to Conaco Inc. U.S. Pat. Nos. 5,766,523; 5,540,903; 5,259,947; 5,437,780; 5,648,041; 5,501,788; 5,540,832 and 6,123,829, all of which are expressly incorporated herein by reference, none of these references teach or disclose use of a carbon fibers of pitch carbon fibers in a wet friction material application.

For all types of friction materials, in order to be useful in "Wet" applications, the friction material must have a wide variety of acceptable characteristics. The friction material must have good anti-shudder characteristics; have high heat resistance and be able to dissipate heat quickly; and, have long lasting, stable and consistent frictional performance. If any of these characteristics are not met, optimum performance of the friction material is not achieved.

It is also important that a suitable impregnating resin be used in the friction material in order to form a high energy application friction material. The friction material must have good shear strength during use when the friction material is infused with brake fluid or transmission oil during use.

Accordingly, it is an object of the present invention to provide an improved friction material with reliable and improved properties compared to those of the prior art.

A further object of this invention is to provide friction materials with improved "anti-shudder", "hot spot" resistance, high heat resistance, high friction stability and durability, and strength.

BRIEF DESCRIPTION OF THE DRAWINGS

The file of this patent contains at least one drawing executed in color. Copies of this patent with color drawing(s) will be provided by the Patent and Trademark Office upon request and payment of necessary fee.

FIG. 17a is a graph showing the midpoint coefficient of friction for Ex. 6-1, 6-2 and Compar. E-1.

FIG. 17b is a graph showing the E/M ratio for Ex. 6-1, 6-2 and Compar. E-1.

FIG. 18a is a graph showing a T-N test data for low oil flow between the midpoint coefficient of friction for Ex. 6-1, 6-2 and Compar. E-1.

FIG. 18b is a graph showing the piston displacement for Ex. 6-1, 6-2 and Compar. E-1.

FIG. 22b is a graph showing piston displacement for Ex. 8-1, 8-2, 8-3, 8-4 and Compar. H-1.

FIG. 22c is a μVPT test for Ex. 8-1, 8-2, 8-3, 8-4 and Compar. H-1

SUMMARY OF THE INVENTION

Figure 1B:
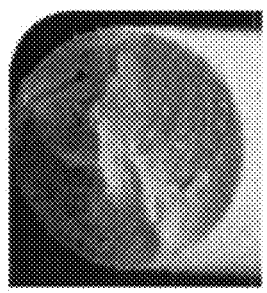
FIG. 1b is a SEM image of a cross-section of a PAN base carbon fiber.

The present invention relates to a friction material comprising a fibrous base material having at least one type of petroleum pitch-based carbon fiber. The friction material is for use in engagement with an opposing friction surface. The fibrous base material has at least one type of petroleum pitch-based carbon fiber which is present on at least one outer surface of the friction material. Petroleum pitch-based carbon fiber is, thus, in contact with the opposing friction surface during the engagement of the friction material with the opposing friction surface.

In a preferred aspect the petroleum pitch-based carbon fiber comprises a solvated pitch which has a fluid temperature of at least 40° C. lower than the melting point of the same pitch in the nonsolvated state. The petroleum pitch-based fibers are capable of being heated to carbonization temperatures without melting.

In certain preferred aspects the petroleum pitch-based carbon fibers have from about 5 to about 40% solvant, by weight. As such petroleum pitch-based carbon fibers are unmeltable upon the removal of the solvant from the fiber. Further advantages and objects of the present invention are evident by referring to the following description and claims.

DETAILED DESCRIPTION OF THE INVENTION

The present invention relates to a friction material having petroleum pitch-based carbon fibers therein. In a preferred aspect, the petroleum pitch-based carbon fibers are present on at least one outer surface of the friction material. The petroleum pitch-based carbon fiber comes into contact with an opposing friction surface during engagement of the friction material.

The friction material of the present invention has a desired ratio of endpoint (E) coefficient of friction to midpoint (M) coefficient of friction in the range of about 1 or less. The favorable E/M ratio indicates that the friction material of the present invention has reduced shudder.

Further, the friction materials comprising the petroleum pitch-based carbon fibers have a midpoint coefficient of friction higher than the conventional friction materials. The midpoint coefficient of friction correlates with the torque and holding capacity of the friction material such that the friction material performs better than previous friction materials.

In spite of the teachings of the art, it was surprisingly found that the petroleum pitch-based carbon fibers did not cause a decrease in the coefficient of friction, as would be expected with carbon materials since carbon fibers are low friction materials. Rather, the coefficient of friction increased with an increase amount of petroleum pitch-based carbon fibers present in the friction material. Also, surprisingly, the friction material having the petroleum pitch-based carbon fiber material has improved durability over comparative materials.

In certain embodiments, the petroleum pitch-based carbon fibers can be used in a single layer friction material.

In other embodiments, the petroleum pitch-based carbon fiber can be used as a second layer on a fibrous base material which includes further petroleum pitch-based carbon fibers in the fibrous base material.

In a yet another embodiment, the petroleum pitch-based carbon fibers are used as a secondary, or top layer on an outer surface of a fibrous base material that has no petroleum pitch-based carbon fibers in the fibrous base material. The friction materials having the petroleum pitch-based carbon fibers as a secondary, or top, layer have increased durability. The petroleum pitch-based carbon fibers act as a heat shield and thus provide additional desired stability to the friction material. Also, the deposited petroleum pitch-based carbon fiber increases the break away coefficient of friction, thus increasing the holding capacity of the friction material.

In certain embodiments, the petroleum pitch-based carbon fiber can be used as a top or secondary layer on an inexpensive porous material comprising, for example cotton and cellulose filler material.

It is to be understood that such carbon fiber materials can be present in a typical formulation such as in the range of about 15 to about 20%, by weight. It is within the contemplated scope of the present invention that other suitable materials can be present in the fibrous base material. Such non-limiting examples include all foreseeable non-woven materials including wet laid, dry laid, needle punch, knit, and stitch bonded non-woven materials. It is also within the contemplated scope of the present invention that other foreseeable forms of wet friction materials can be used. It is also within the contemplated scope of the present invention that the petroleum pitch-based carbon fiber can be used alone or blended with other fibers and fillers.

Figure 1A:
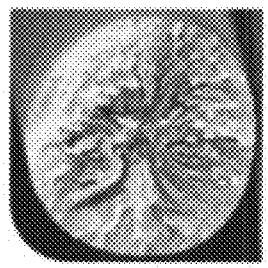
FIG. 1a is a SEM image of a cross-section of a pitch-based carbon fiber.

The petroleum pitch-based carbon fiber has a unique structure. FIG. 1A shows a cross-section of the pitch-based carbon fiber used in the present invention while FIG. 1B shows a cross-section of a polyacrylonitrile (PAN) based carbon fiber which is conventionally used in friction materials.

In certain embodiments, the carbon fiber is made from a solvated isotropic pitch which has a fluid temperature of at least about 40° C. lower, and often 200° C. or more, than the melting point of the same pitch in the non-solvated state. Fibers made from this solvated isotropic pitch have desirable improved stabilization characteristics such that the fibers can be heated to carbonization temperatures without melting. Further, any mesophase present in the carbon fibers is not highly elongated by shear forces associated with the formation of the carbon fibers. Further, preferred petroleum pitch-based carbon fibers have about 5 to about 40% solvent, by weight, where the pitch fiber is unmeltable upon removable of the solvent from the fiber.

In certain embodiments, the petroleum pitch-based carbon fiber used in the present invention is a fiber (as described in U.S. Pat. No. 6,123,829 fully incorporated herein by reference) which has an oxygen diffusion rate to its center which is approximate equal to, or greater than, the oxidation rate at an outer surface of the fibers. The fiber's center becomes oxidatably stabilized at a rate ranging from slightly less than, to greater than, the rate of consumption of carbon by oxygen at the fiber's surface. The petroleum pitch-based carbon fibers preferably have a softening point in excess of 300° C. and preferably greater than 350° C. such that the fibers are capable of being subjected to a stabilization process at temperatures greater than a fibrous spinning temperature. It was not until the present invention that such petroleum based carbon fibers were used in a friction material.

It is to be understood that "pitch" generally refers to by-products in the production of natural asphalt petroleum pitches and heavy oil obtained as a by-product in a naphtha cracking industry and pitches of high carbon content obtained from coal. Petroleum pitch generally refers to the residual carbonaceous material obtained from the catalytic and/or thermal cracking of petroleum distillates or residues. Solvated pitches generally contain between about 5 to about 40% by wt. of solvent in the pitch and have a fluid temperature lower than the melting point of a pitch component when not associated with solvent. Typically the fluid temperature is lower than about 40° C. The fluid temperature for a solvated pitch is generally determined in the industry to be the temperature at which the viscosity of 6000 poise is registered upon cooling the solvated pitch at 1° C. per minute from a temperature in excess of its melting point. The solvent content refers to a value determined by weight loss on vacuum separation of the solvent.

In certain aspects, the solvated pitch requires either a shorter stabilization step or no stabilization step during the production of the fibers, thus creating great cost savings for the stabilization. Usually oxidation has been needed in the past to produce other types of carbon fibers to prevent melting of the fibers when the fibers are heated to the carbonization temperature. The petroleum pitch-based carbon fibers are defined herein as fibers following carbonization and/or graphitization made from a solvated pitch. It is to be understood that both isotropic pitch (which comprises molecules not aligned in optically order liquid crystal formation) and mesophase, or anisotropic, pitch (which comprises molecules having aromatic structures, which through interaction, are associated together to form optically ordered liquid crystal which are either liquid or solid depending on the temperature) are useful in making the petroleum pitch-based carbon fibers used in the present invention.

EXAMPLES

The following examples illustrate various embodiments of the present invention. It should be understood, however, that other embodiments not shown in the following examples are also contemplated as being within the scope of the present invention.

Example I

In certain embodiments, the friction material can comprise a fibrous base material comprising, by weight percent: about 20 to about 60% fibrillated aramid fibers, about 10 to about 30% silica filler material, about 10 to about 20% graphite, and about 5 to about 20% petroleum pitch-based carbon fibers. In one embodiment of the present invention, Ex. 1-1 and 1-2 comprise fibrillated aramid fiber at about 50%, silica filler at about 20%, graphite at about 15%, petroleum pitch-based carbon fiber at about 15%, and optionally latex at about 2% addon was used to make a fibrous base material having a basis weight of about 155 lb/3000 ft$^2$ and having a caliper of about 29 mils.

Figure 2:
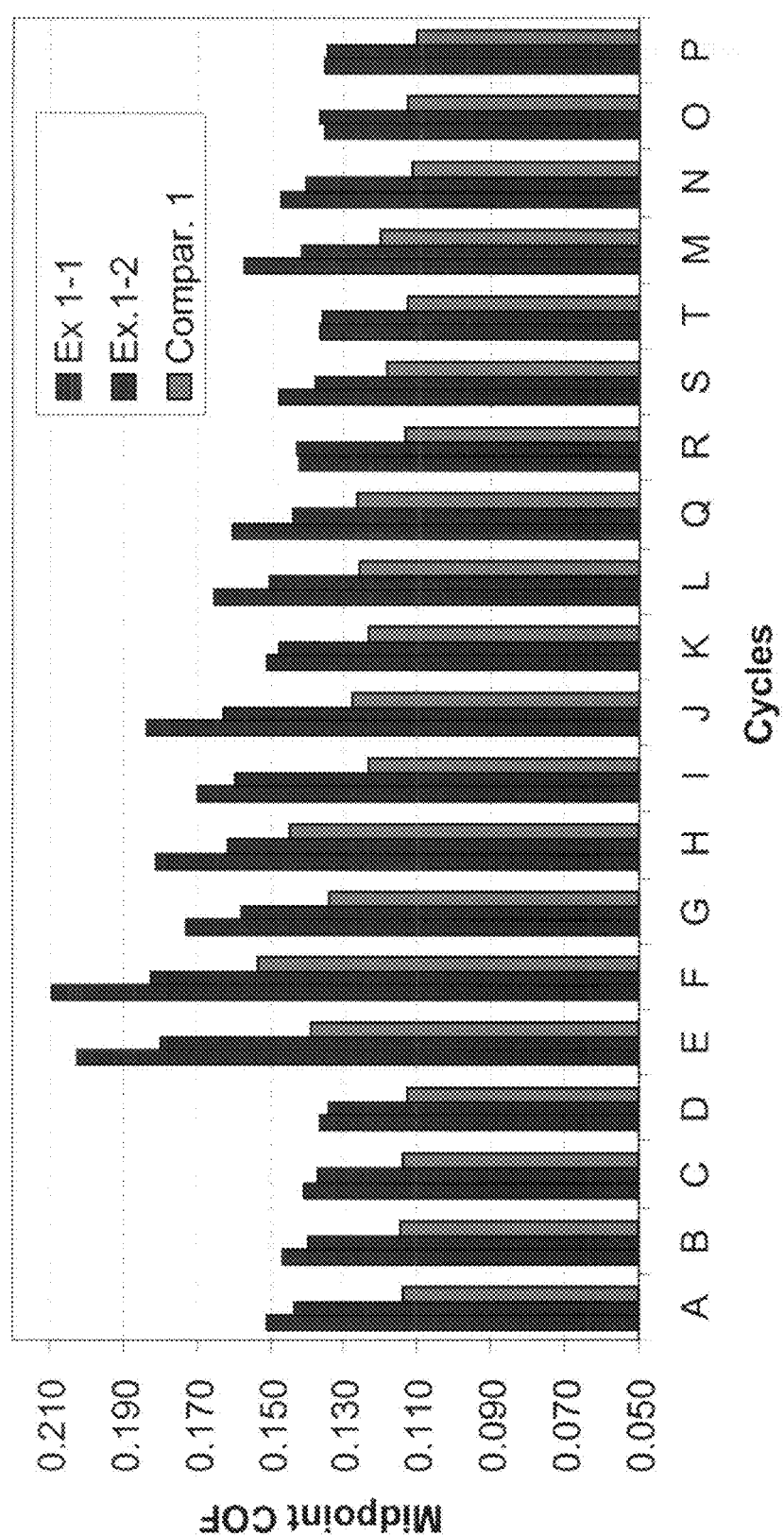
FIG. 2 is a graph showing test data for midpoint coefficient of friction, for Ex. 1-1, 1-2 and Compar. A.
Figure 3:
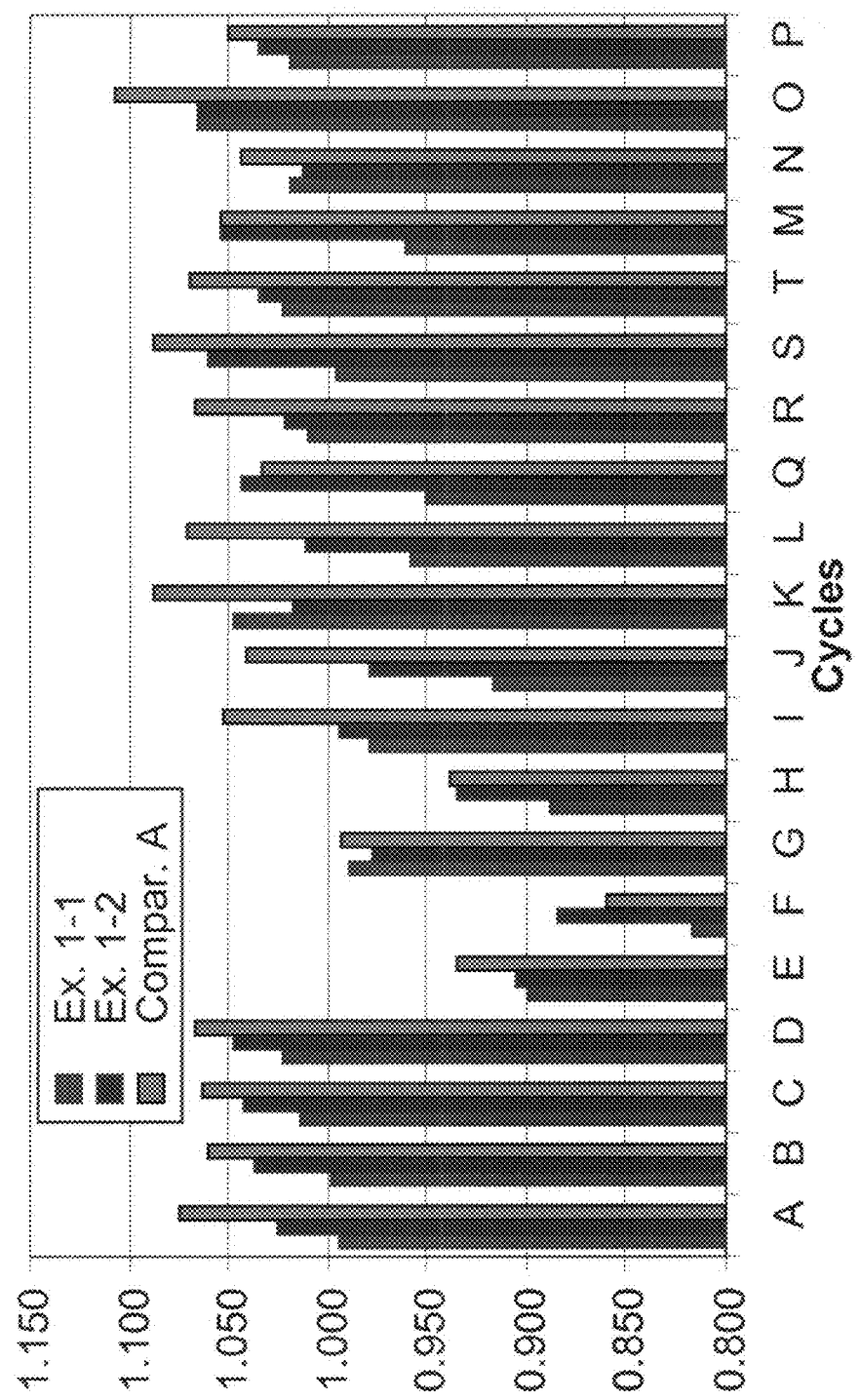
FIG. 3 is a graph showing the ratio of endpoint (E) coefficient of friction to midpoint (M) coefficient of friction for Ex. 1-1, 1-2 and Compar. A.

FIG. 2 is a test showing a shifting clutch application showing a midpoint coefficient of friction for two examples of petroleum pitch-based material (shown as Ex. 1-1 and Ex. 1-2) and a comparative standard carbon fiber (shown as Compar. 1) for different cycles, labeled A through P. According to the present invention, it is desired to have the friction material have a ratio of endpoint (E) coefficient of friction to midpoint (M) coefficient of friction of about 1 or less. This E/M ratio is shown in FIG. 3 where the friction material comprising petroleum pitch-based carbon fibers generally have an E/M ratio less than E/M ratio for the comparative friction material having the fiber material.

Figure 4:
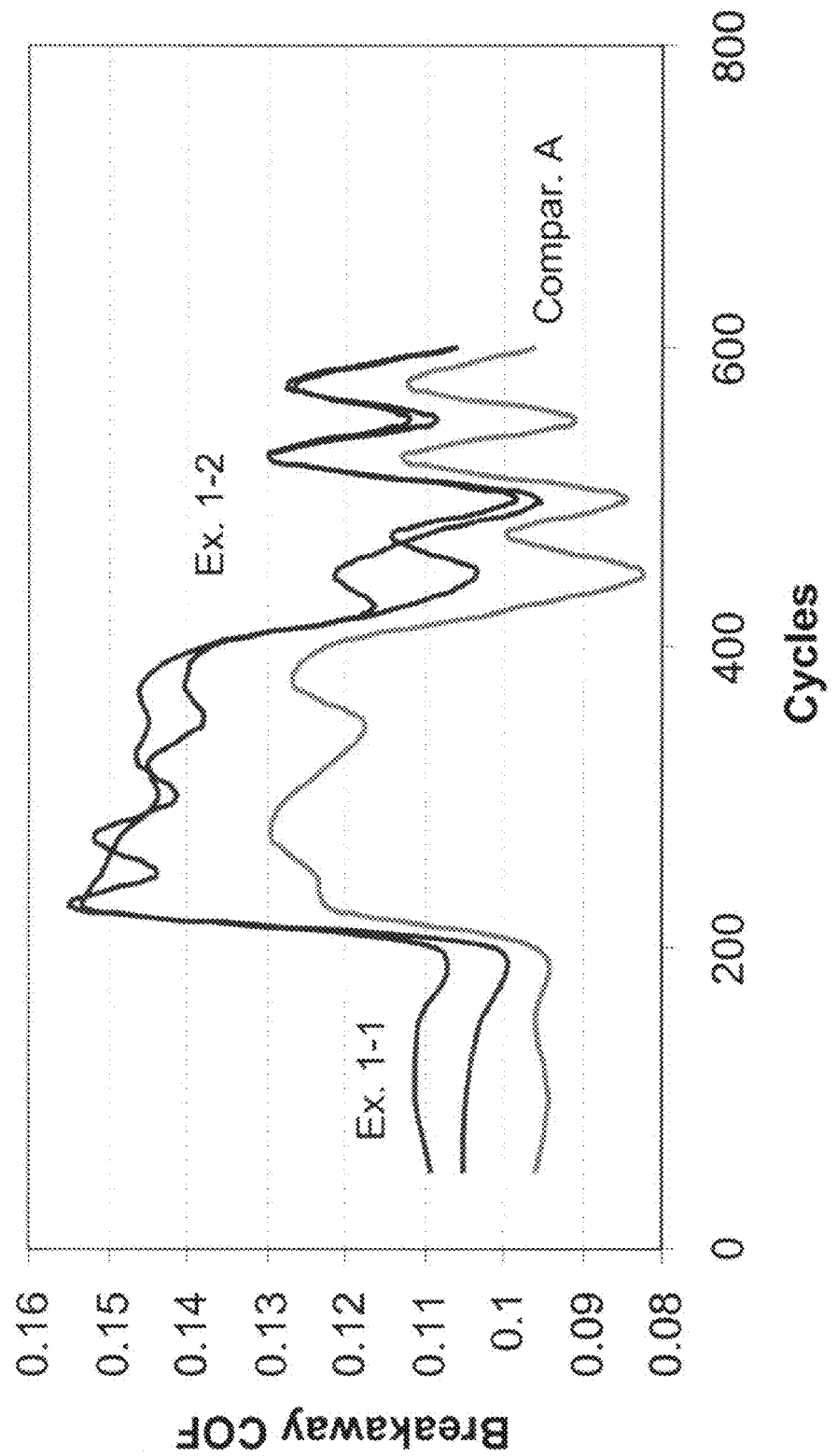
FIG. 4 is a graph showing the breakaway coefficient of friction versus number of cycles for Ex. 1-1, 1-2 and Compar. A.

The breakaway coefficient of friction test shown in FIG. 4 depicts the holding capacity of the friction material. As can be seen, the holding capacity for the Ex. 1 friction materials comprising petroleum-based carbon fibers is much higher than for the conventional fiber. The friction materials comprising the petroleum pitch-based carbon fibers have a midpoint coefficient of friction about 20% higher than the Compar. A conventional friction materials having standard carbon fibers. Further the Ex. 1 materials have a desirable low end to midpoint coefficient of friction ratio and have a breakaway coefficient of friction of about 11 to 19% higher than the conventional material.

Example II

In another embodiment of the present invention, the friction material comprises by weight percent, about 50 to about 60% aramid fibers, about 3 to about 10% silica filler, about 20 to about 30% graphite and about 10 to about 20% petroleum pitch-based carbon fibers. In another embodiment of the present invention, Ex. 2 is a friction material having the following formulation, by weight:

Aramid fibers, about 55%,

Silica filler, about 5%,

Graphite, about 25%, and

Petroleum pitch-based carbon fiber, about 15%; and optionally

Latex addon about 2% additional.

The Ex. 2 fibrous base material has a basis weight of about a 166 lb/3000 ft$^2$ basis weight and a caliper of about 29 mils.

Figure 5:
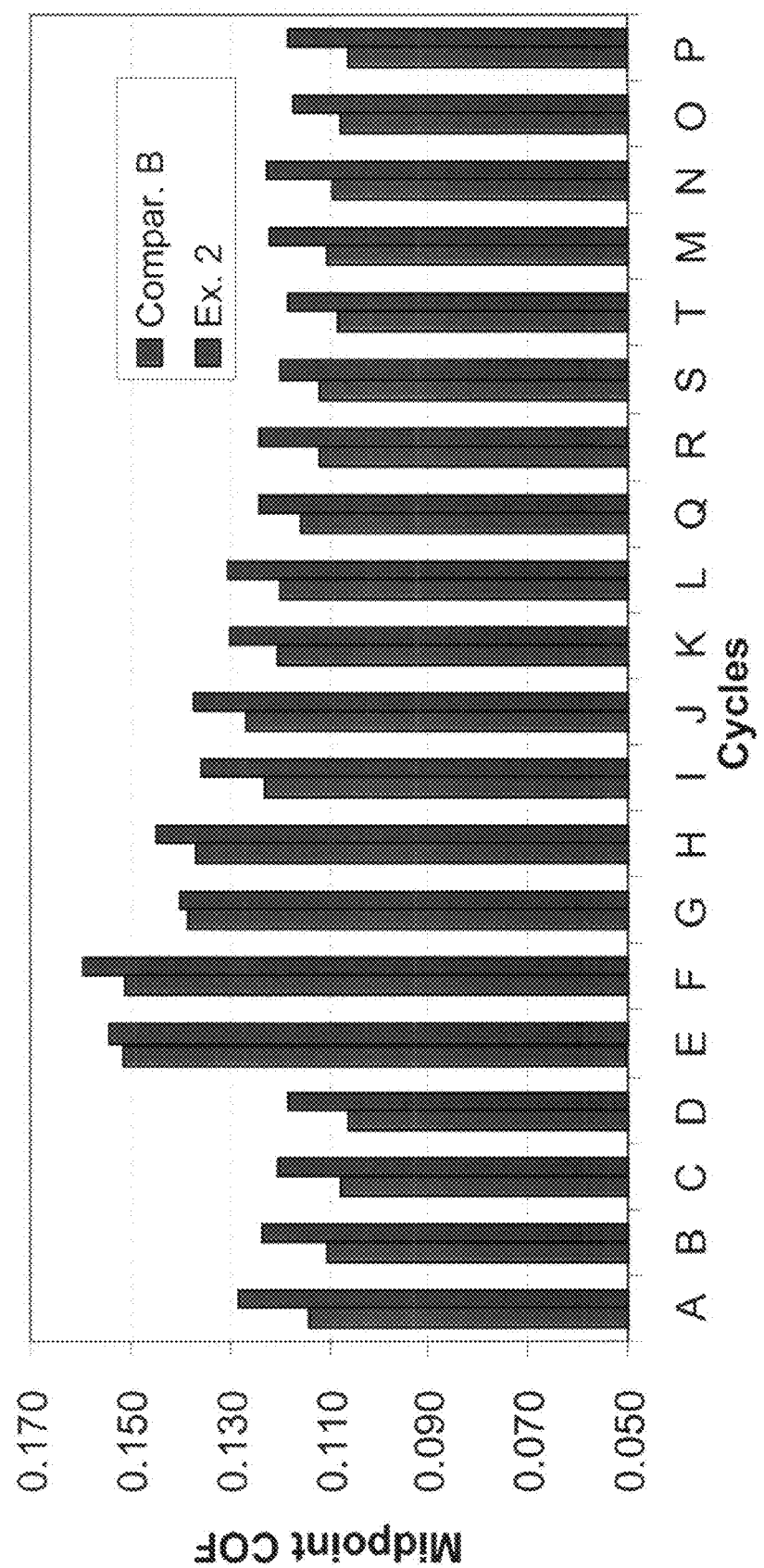
FIG. 5 is a graph showing the midpoint coefficient of friction over cycles 4, Ex. 2 and Compar. B.

FIG. 5 shows the test for the midpoint coefficient of friction for the primary layer for a Compar. B comparative sample which contains a similar formulation to Ex. 2 except that conventional carbon fibers were used instead of petroleum pitch-based carbon fibers.

Figure 6:
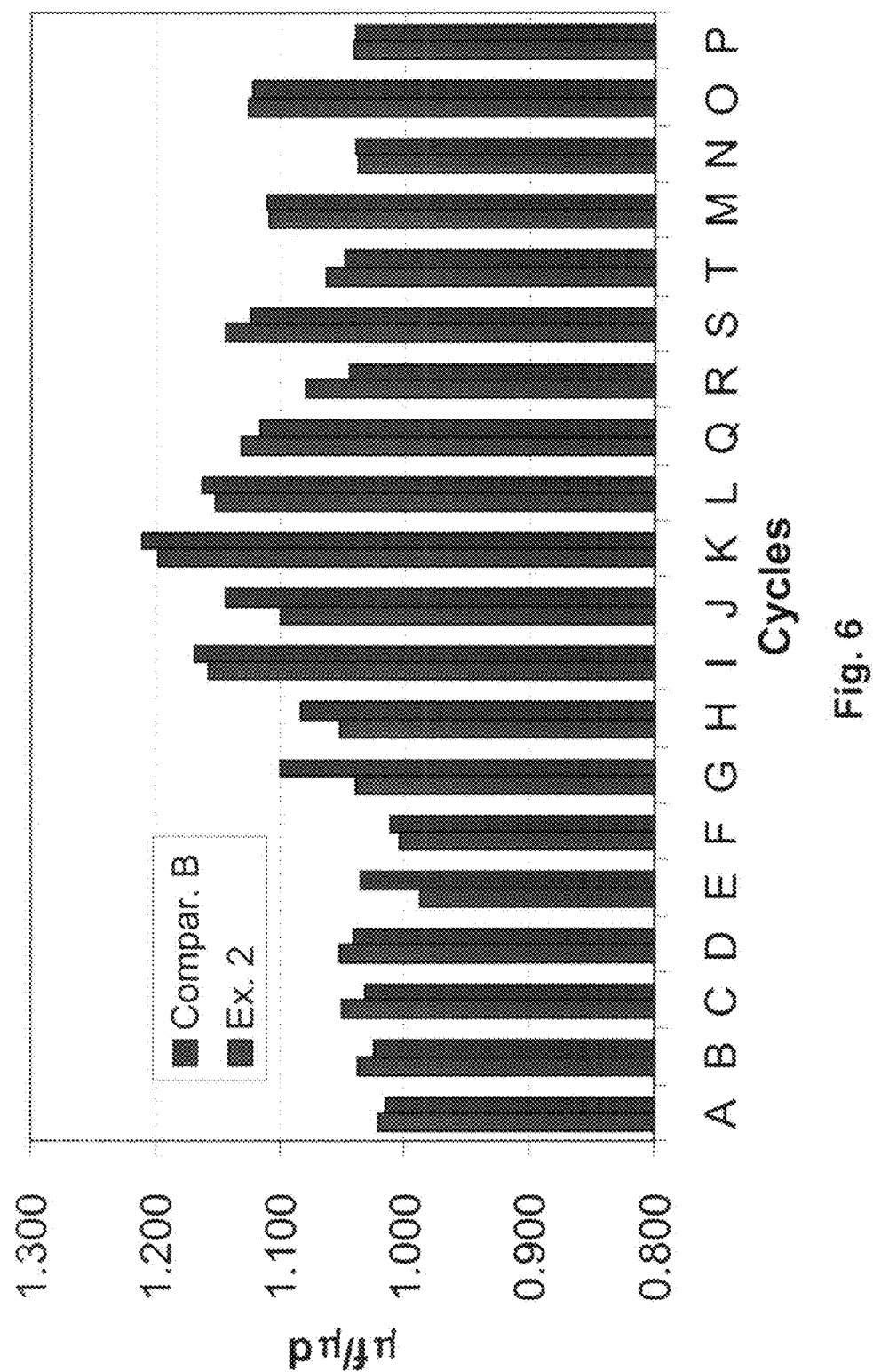
FIG. 6 is a graph showing the E/M ratio for Compar. B and Ex. 2.

The endpoint/midpoint ratio for the primary layers of Ex. 2 and Compar. B are shown in FIG. 6. The materials stay in desirable ranges.

Figure 7:
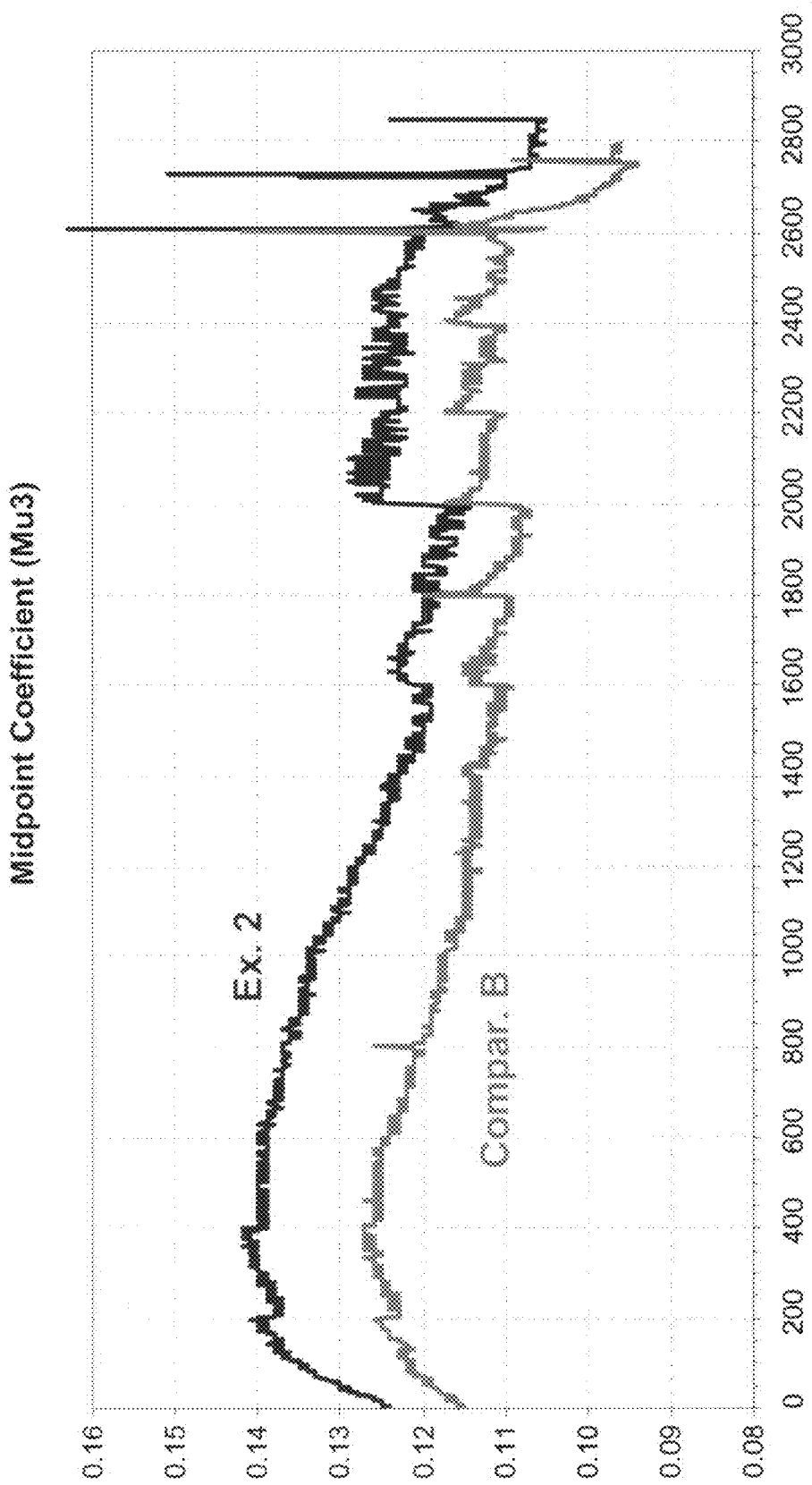
FIG. 7 is a graph showing the midpoint coefficient of friction for Ex. 2 and Compar. B.

FIG. 7 is a graph of test data showing midpoint coefficient of friction for the primary layers for the carbon fiber in Ex. 2 and the Compar. B.

Figure 8:
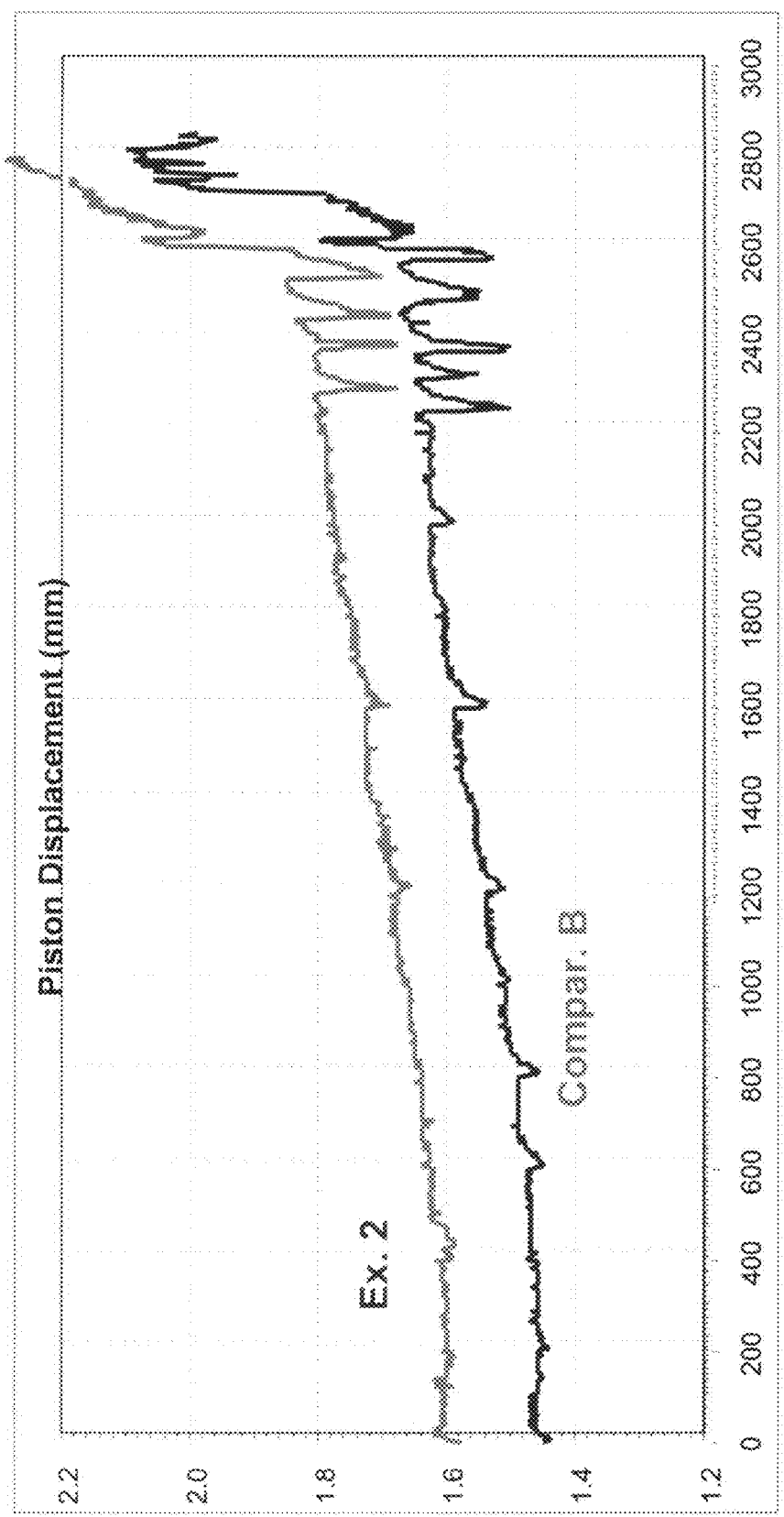
FIG. 8 is a graph showing piston displacement for Ex. 2 and Compar. B.

FIG. 8 is a graph of a test comprising piston displacement to cycles. The Ex. 2 petroleum based carbon fiber material performs the same as the Compar. B.

Example III

In yet another embodiment of the present invention the friction material comprises a fibrous base material comprising, by weight percent, about 50 to about 70% silica friction modifying materials and about 30 to about 50% fibers where the fibers comprise a mixture of aramid fibers and petroleum pitch-based carbon fibers. In certain embodiments, the petroleum pitch-based carbon fibers are present at about 5 to about 50% of the fibers present in the friction material, and in certain embodiments, the petroleum pitch-base fibers are present at about 45 to about 55% of the fibers.

In other embodiments, the amount of petroleum pitch-based carbon fibers can be varied, depending on the end use application. As such, various friction materials have about 45 to about 55% petroleum pitch-based fibers based on the amount of fibers present in the friction material while others have about 30 to about 40% petroleum pitch-base fibers; still others have about 10 to about 20% petroleum pitch-based carbon fibers; and still others have about 3 to about 7% petroleum pitch-based carbon fibers. In the following examples, the friction materials comprise a celite and fibrous base material having different ratios of aramid fibers to petroleum pitch-based carbon fibers. The comparative examples contain fibrous base materials having conventional carbon fibers.

When the formulations contain an increased amount of petroleum pitch-based carbon fibers, there was an expectation that the coefficient of friction would drop since the carbon fiber is a low friction material. Surprisingly, however, the coefficient of friction increased with an increase in the amount of petroleum pitch-based carbon fiber present in the invention. The following examples were tested.

TABLE 1

| Material | Compar. E-5 Range % | Compar. F-1 Range |
|---|---|---|
| Cotton Fibers | 10-15 | 15-20 |
| Aramid Fibers | 35-45 | 35-45 |
| Carbon Fiber | 3-10 | 3-10 |
| Carbon Particles | 10-30 | 10-20 |
| Celite filler | 25-35 | 15-20 |
| Latex addon | | |

Figure 9:
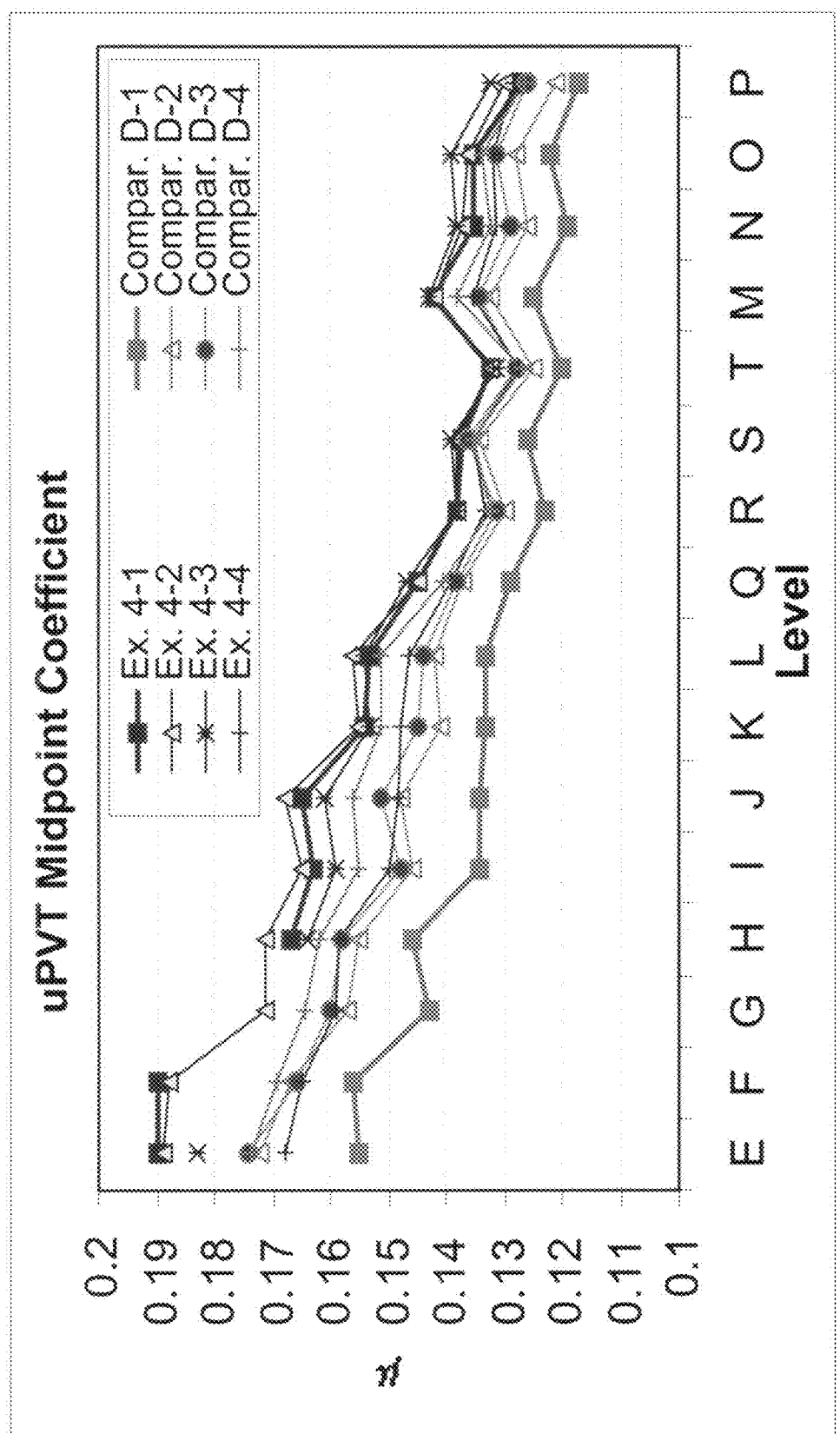
FIG. 9 is a graph showing the midpoint coefficient of friction for Ex. 4-1, 4-2, 4-3 and 4-4 as compared to Compar. D-1, D-2, D-3 and D-4.

FIG. 9 shows the petroleum pitch-based carbon fiber μ PVT test in DEX III for samples different percents of carbon fiber. FIG. 9 clearly shows that the midpoint coefficient of friction is greater overall for the Examples having petroleum pitch-based carbon fibers and, most surprisingly, is greatest at the highest concentrations of petroleum pitch-based carbon fibers.

Figure 10:
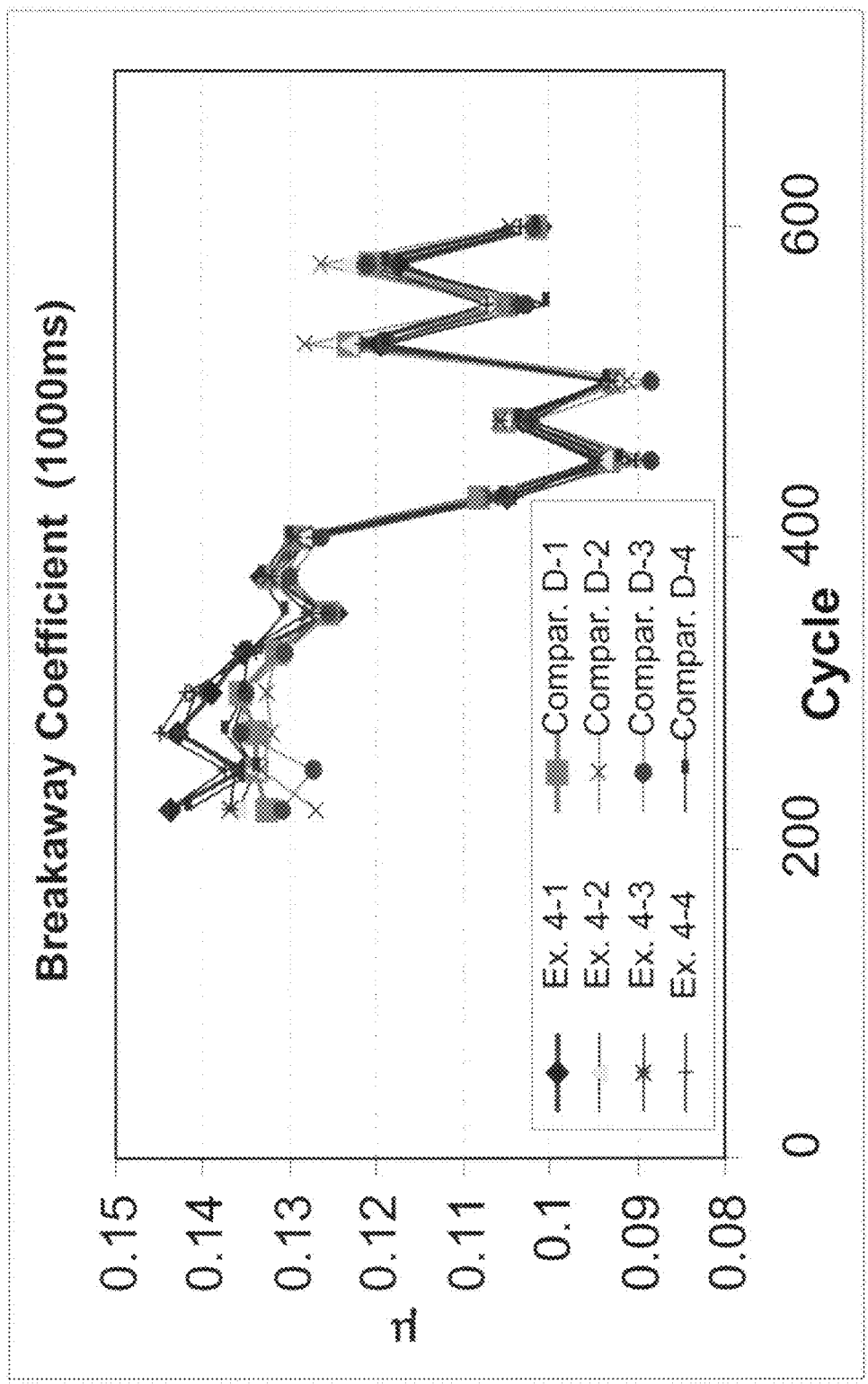
FIG. 10 is a graph showing a breakaway coefficient of friction for Ex. 4-1, 4-2, 4-3 and 4-4 and Compar. Ex. D-1, D-2, D-3 and D4.

The break-away coefficient of friction test for these Ex. 4-1, 4-2, 4-3, and 4-4 and Compar. D-1, D-2, D-3 and D-4 are shown in FIG. 10. Thus, it can be clearly seen that increasing amounts of standard carbon fiber, decreases the coefficient of friction while, surprisingly, the coefficient of friction in the friction materials with the petroleum pitch-based carbon fiber remains steady or increased.

Example IV

In yet another embodiment of the present invention, the petroleum pitch-base carbon fiber is deposited on a fibrous base material having no petroleum pitch-base carbon fibers in the fibrous base material.

The primary layer can comprise different types of fibrous base materials. One useful fibrous based material comprises, by weight percent, about 10 to about 15% cotton fibers, about 35 to about 45% aramid fibers, about 3 to about 10% non-petroleum pitch-based carbon fibers, about 10 to about 20% carbon particles, and about 25 to about 35% celite friction modifying materials.

Another primary layer useful with the present invention comprises, by weight percent, about 5 to about 20% cotton fibers, about 10 to about 50% aramid fibers, about 10 to about 35% carbon particles, and about 2 to about 15% non-petroleum pitch-based carbon fibers.

In certain embodiments, the petroleum pitch-based carbon fibers can have an average length of about 10 to about 30 microns. In other embodiments, the petroleum pitch-based carbon fibers can have an average length of about 150 to about 250 microns.

Figure 15A:
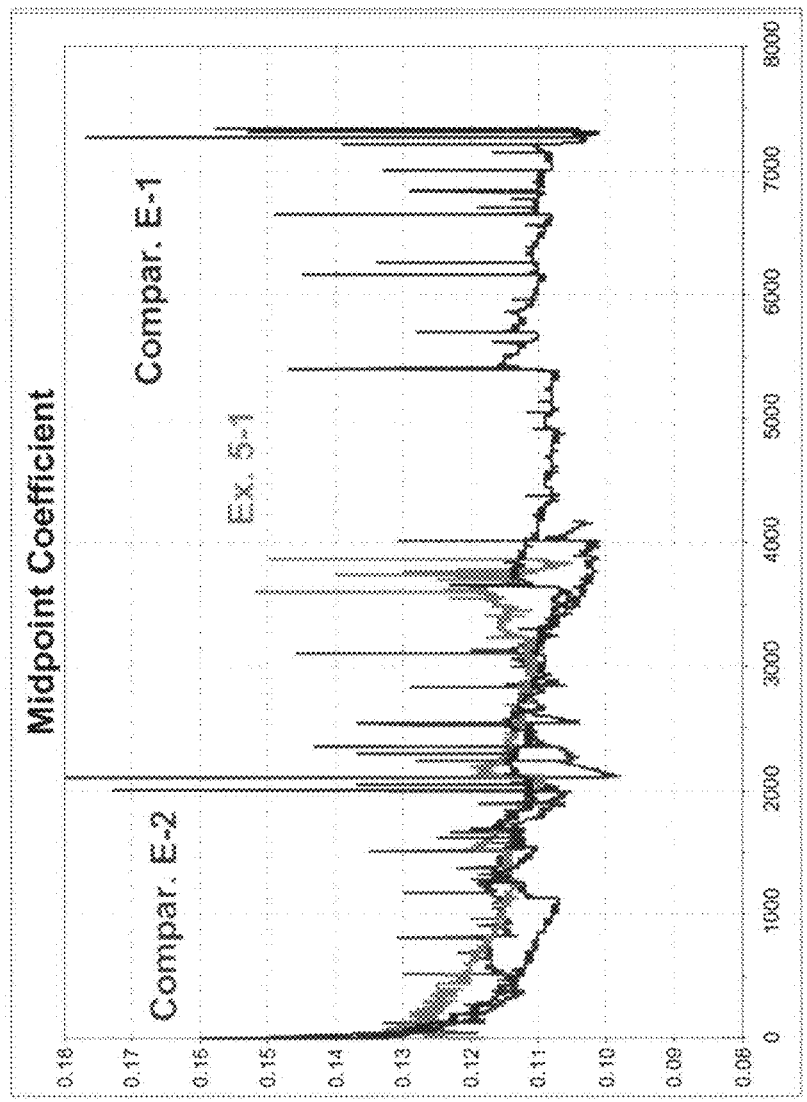
FIG. 15a is a graph showing a T-N test data for level 8 of Ex. 5-1 and Compar. E-1 and E-2.
Figure 15B:
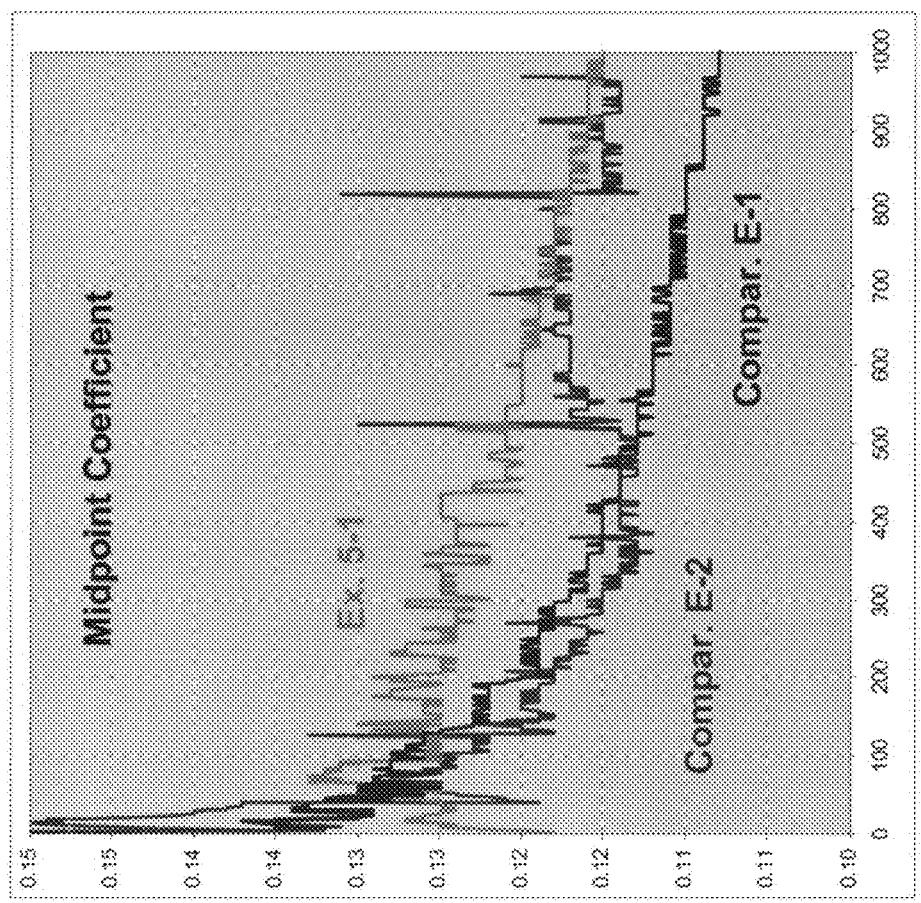
FIG. 15b is an enlargement of the initial portion of the graph shown in FIG. 15A.

It is to be understood that the amount of petroleum pitch-based carbon fibers can range from about 1 to about 15 lbs/3000 sq. ft. Particularly useful embodiments include a secondary layer of about 3 to about 5, and most preferably about 4 lbs/3000 sq. ft. Still other useful embodiments include about 8 to about 15 lbs/3000 sq. ft. In certain embodiments, the petroleum pitch-based carbon fiber secondary layer can be combined with celite friction modifying materials having an average diameter of about 6 microns. In the example herein, about 9 lbs./3,000 sq. ft. of petroleum pitch-base carbon fibers, (in some examples having lengths of about 20 microns and in other examples having average lengths of about 200 microns), were deposited on samples of fibrous base materials as shown in Table 2 below.

compared to Ex. 5-1 of the present invention. As can be seen in FIGS. 15a and 15b, the petroleum pitch-base carbon fiber material improves the durability of the friction material. Further, it should be understood that, in certain embodiments, 9 lbs. deposit can be greatly decreased while retaining the desired durability and friction characteristics. Note that Compar. E-2 (BWA 6100) is similar to the Compar. E-1 which has 9 lbs. of celite deposited on the surface. Therefore, a direct comparison of 9 lbs. of secondary material can readily be made between looking at Ex. 5-1 and Compar. E-2.

Figure 16:
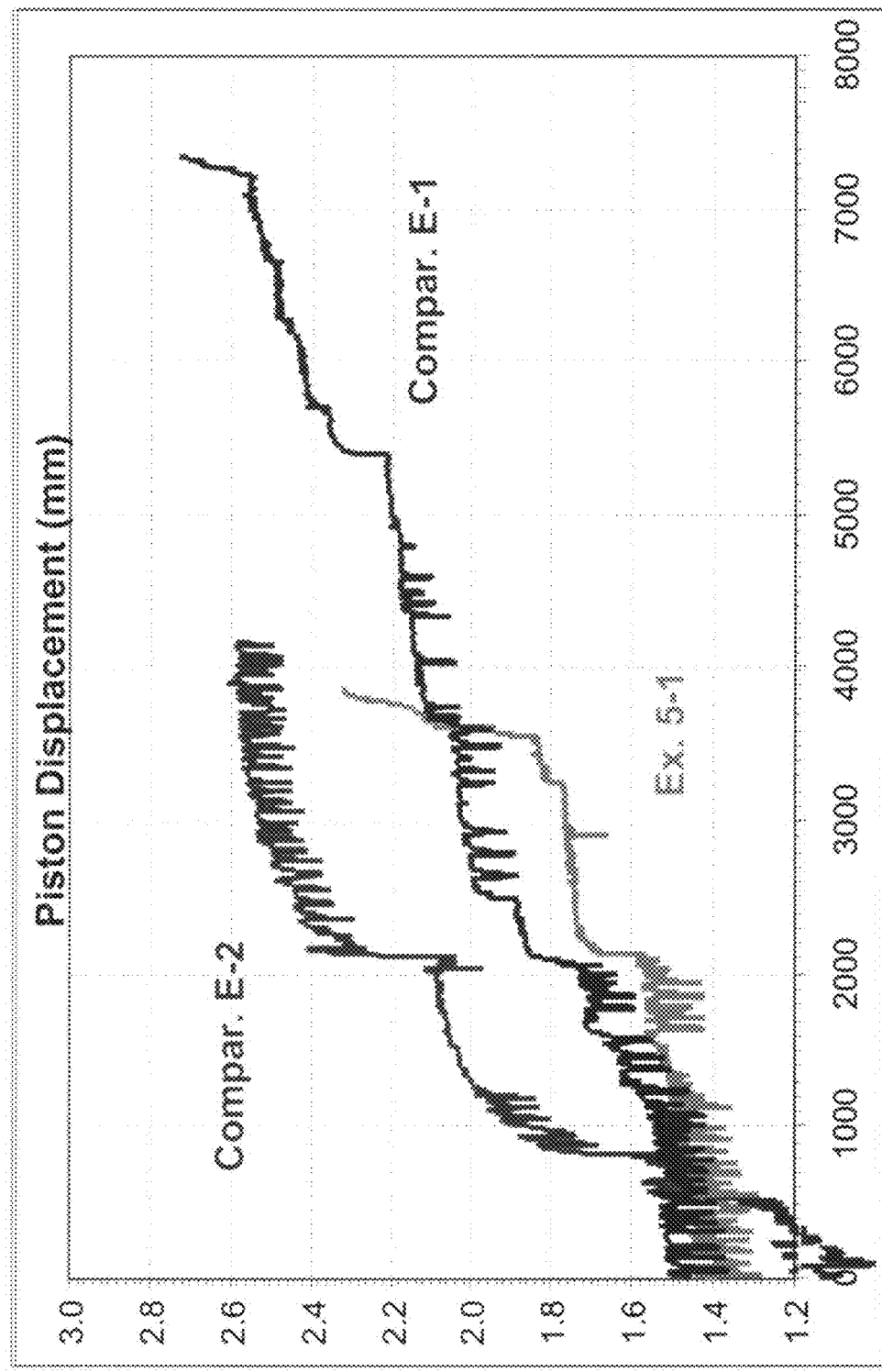
FIG. 16 is a T-N test showing piston displacement for Ex. 5-1 and Compar. E-1 and E-2.
Figure 17C:
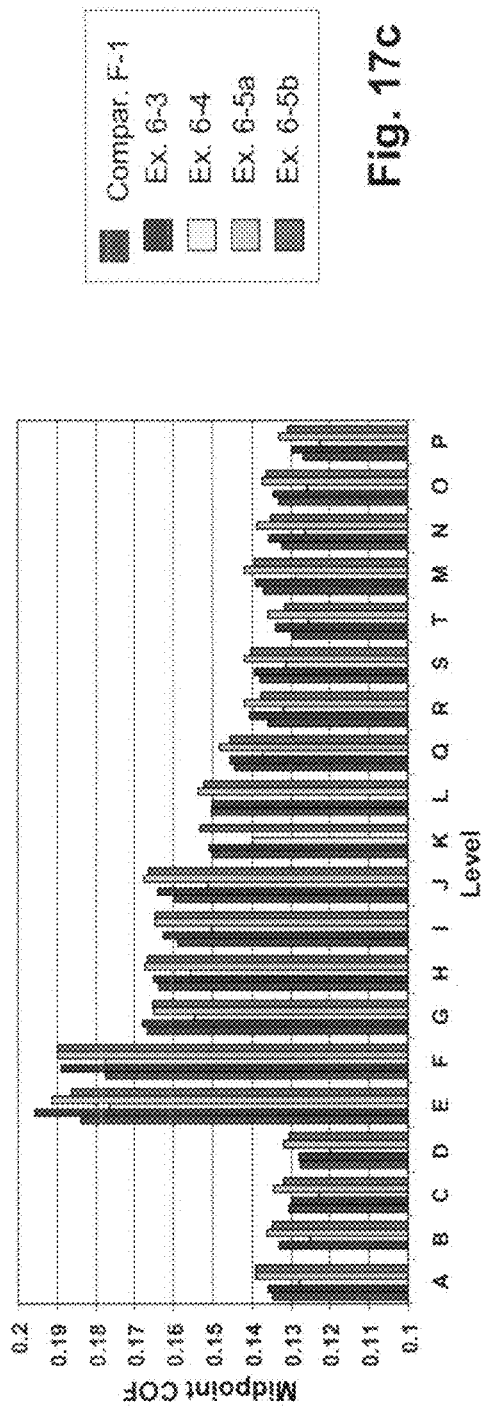
FIG. 17c is a graph showing the midpoint coefficient of friction for Ex. 6-3, 6-4, 6-5a and 6-5b and Compar. F-1.
Figure 17D:
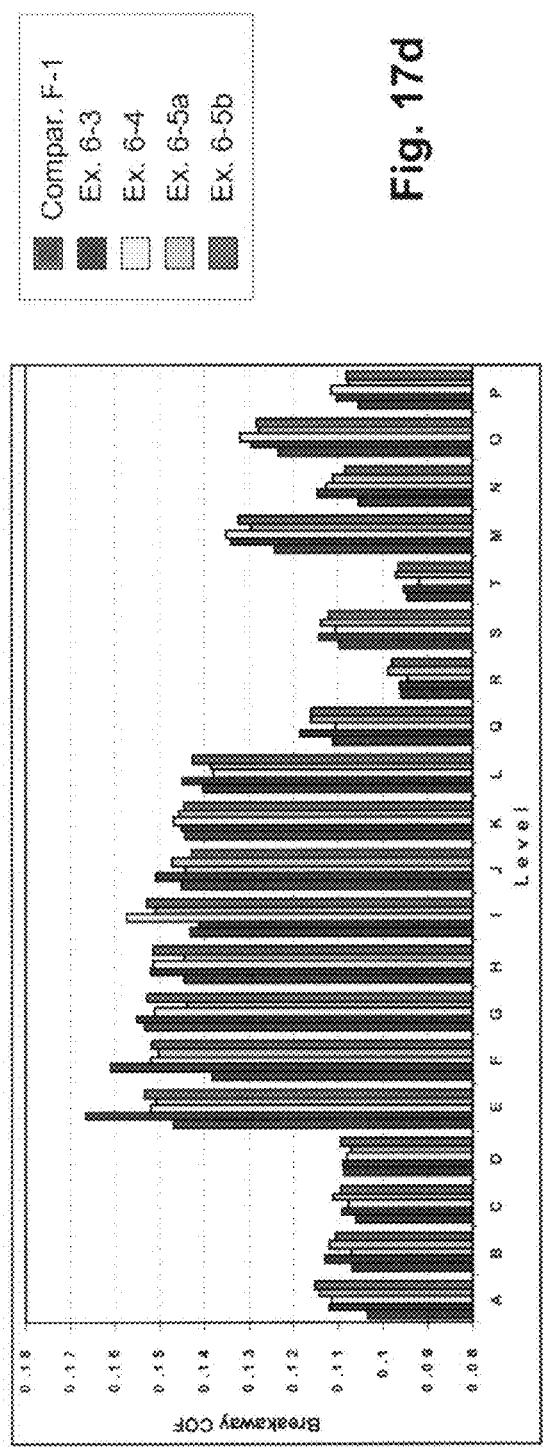
FIG. 17d is a graph showing the E/M ratio for Ex. 6-3, 6-4, 6-5a and 6-5b and Compar. F-1.

Further, the step durability test T-N shown at level 8 in FIG. 16 for a piston displacement test compares the Compar. E-2, Compar. E-1 with the Ex. 5-1. There is less overall piston displacement and therefore more stability for the friction materials having the petroleum pitch-base carbon fiber as a secondary or top layer. The petroleum pitch-based carbon fibers acts as a heat shield and thus provides stability.

Example V

In yet another embodiment of the present invention, lower amounts of petroleum pitch-based carbon fiber (pp-carbon) material were deposited on the Compar. E-1 and a Compar. F-1 whose formulations are given below.

TABLE 3

| The Examples in FIGS. 17a-d comprising: | | |
|---|---|---|
| | Base Layer | Secondary Layer |
| Ex. 6-1 | Compar. E-5 | 4 lb. 20 μm pp-carbon fiber |
| Ex. 6-2 | Compar. E-5 | 4 lb. 20 μm pp-carbon fiber and 9 lb. smaller sized celite filler |
| Ex. 6-3 | Compar. F-1 | 4 lb 20 μm pp-carbon fiber |
| Ex. 6-4 | Compar. F-1 | 9 lb 20 μm pp-carbon fiber |
| Ex. 6-5a | Compar. F-1 | 9 lb 20 μm pp-carbon fiber and 12 lb 6μ ave. diameter celite filler with latex addon |
| Ex. 6-5b | Compar. F-1 | 9 lb 20 μm pp-carbon fiber and 12 lb 6μ ave. diameter celite filler |
| Compar. E-5 | Cotton 10-15% | 0 |

TABLE 2

| | | Example | | | | | | | |
|---|---|---|---|---|---|---|---|---|---|
| | | Ex. 4-1 | Compar. D-1 | Ex. 4-2 | Compar. D-2 | Ex. 4-3 | Compar. D-3 | Ex. 4-4 | Compar. D-4 |
| Carbon Fiber | % | 49.8 | 45 | 34.2 | 30 | 17.7 | 15 | 6 | 5 |
| BW | #/3000 | 160 | 160 | 160 | 160 | 160 | 160 | 160 | 160 |
| Caliper | In | 0.0279 | 0.0291 | 0.027 | 0.0281 | 0.0282 | 0.029 | 0.0287 | 0.0289 |
| Density | G/cc | 0.367 | 0.352 | 0.380 | 0.365 | 0.364 | 0.353 | 0.357 | 0.355 |

Figure 11:
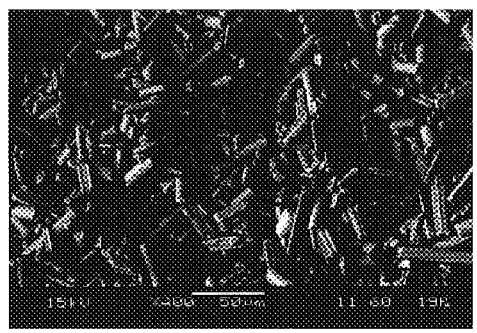
FIG. 11 is a SEM photograph showing the fiber length of 20 microns for petroleum pitch-based carbon fibers.
Figure 12:
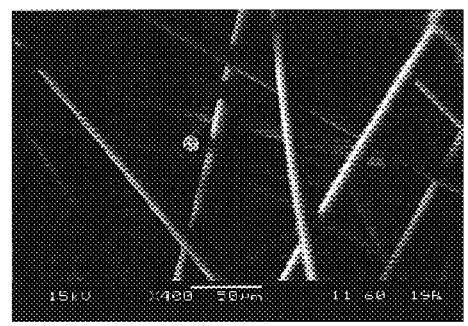
FIG. 12 is a SEM image showing 200 micron length petroleum pitch-based carbon fibers.
Figure 13:
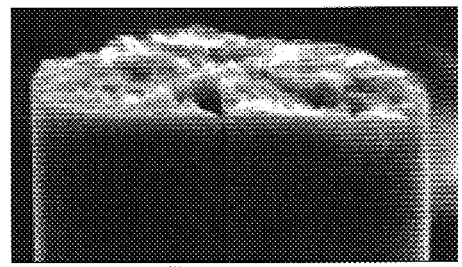
FIG. 13 is a cross-section f a petroleum pitch-based carbon fiber.

FIGS. 11, 12 and 13 show microphotographs of the material used in this example. FIG. 11 shows Ex. 5-1 which has a top or secondary layer of petroleum pitch-based carbon fibers having the average length of about 20 microns. FIG. 12 shows Ex. 5-2 which has a top, or secondary layer of petroleum pitch-based carbon fibers having an average length of about 200 microns. FIG. 13 is a cross-sectional view of the fibers. In each example, about 9 lbs. of the carbon fiber were deposited on the fibrous base materials.

Figure 14:
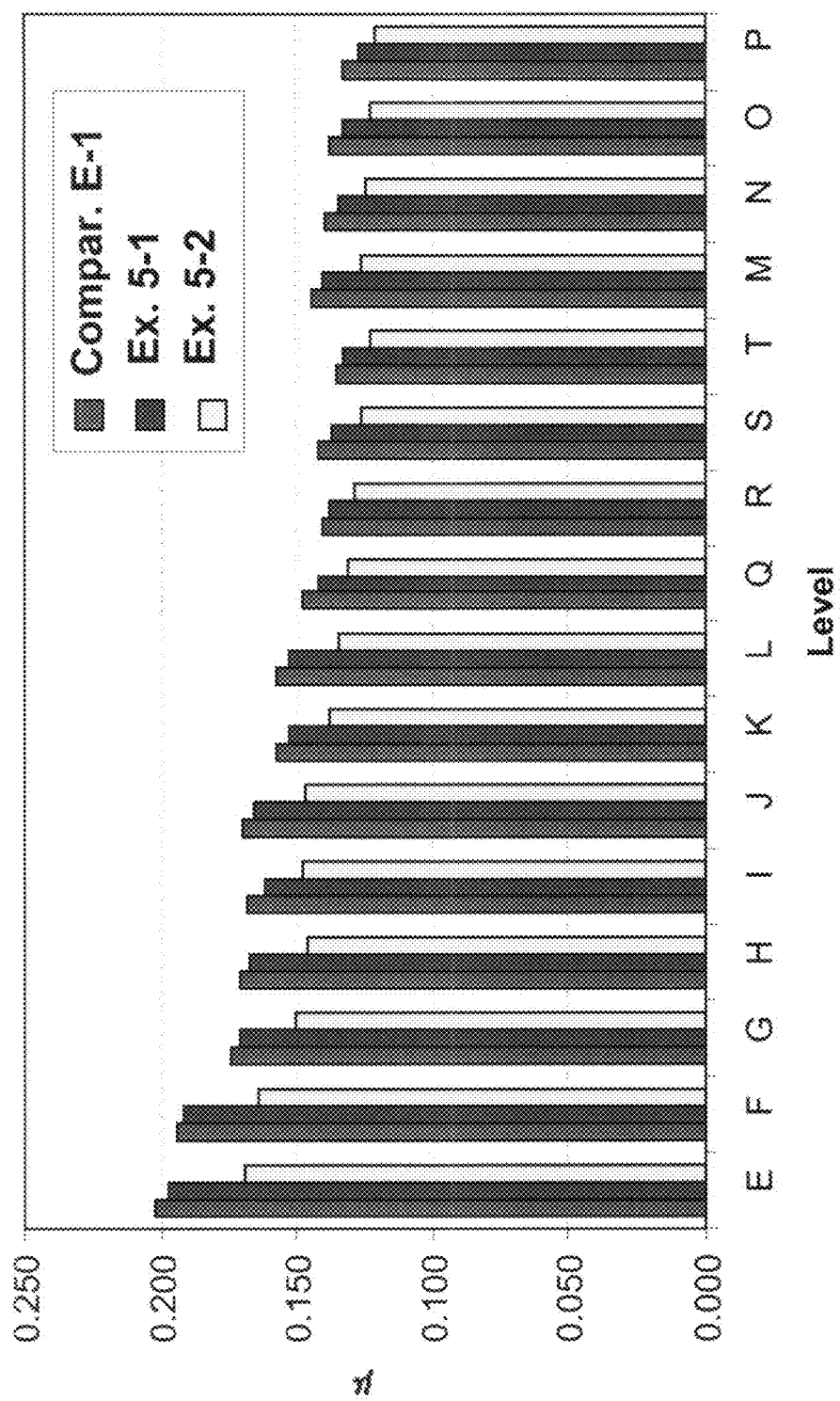
FIG. 14 is a graph showing the μPVT test for Ex. 5-1, 5-2 and Compar. E-1.

FIG. 14 shows the μPVT test for the Compar. E material.

FIGS. 15a and 15b show a T-N test showing a step level test for the friction materials for Compar. E-1 and Compar. E-2

TABLE 3-continued

| The Examples in FIGS. 17a-d comprising: | | |
|---|---|---|
| | Base Layer | Secondary Layer |
| | Aramid 35-45% | |
| | Carbon fiber 3-10% | |
| | Carbon particles 10-30% | |
| | Celite 25-35% | |
| Compar. F-1 | Cotton 15-20% | 0 |
| | Aramid 35-40% | |

TABLE 3-continued

The Examples in FIGS. 17a-d comprising:

| Base Layer | Secondary Layer |
|---|---|
| | Carbon Fiber 3-10% |
| | Carbon particles 10-20% |
| | Celite 15-20% |

In various examples the petroleum pitch-based carbon fibers were deposited alone and, in other examples in combination with either 9 lbs. or 12 lbs. of a superfloss-type Celica filler which has an average micron particle size of about 6 microns which is smaller than the celite friction material particle size.

FIGS. 17a-d compare the examples and show that, while the effect of the additional petroleum pitch-based carbon fiber material on the coefficient of friction is minimal, the deposited petroleum pitch-based carbon fiber increases the breakaway coefficient of friction.

FIGS. 18a and 18b compare the commercial product, Compar. E-1, with Ex. 6-1 and Ex. 6-2. When a lower amount, such as the 4 lbs. of petroleum pitch-based carbon fiber deposit is used as a deposit or secondary layer, the coefficient of friction is slightly higher than the Compar. E-1 base material while the durability is of the Ex. 6-1 improved significantly.

Figure 19:
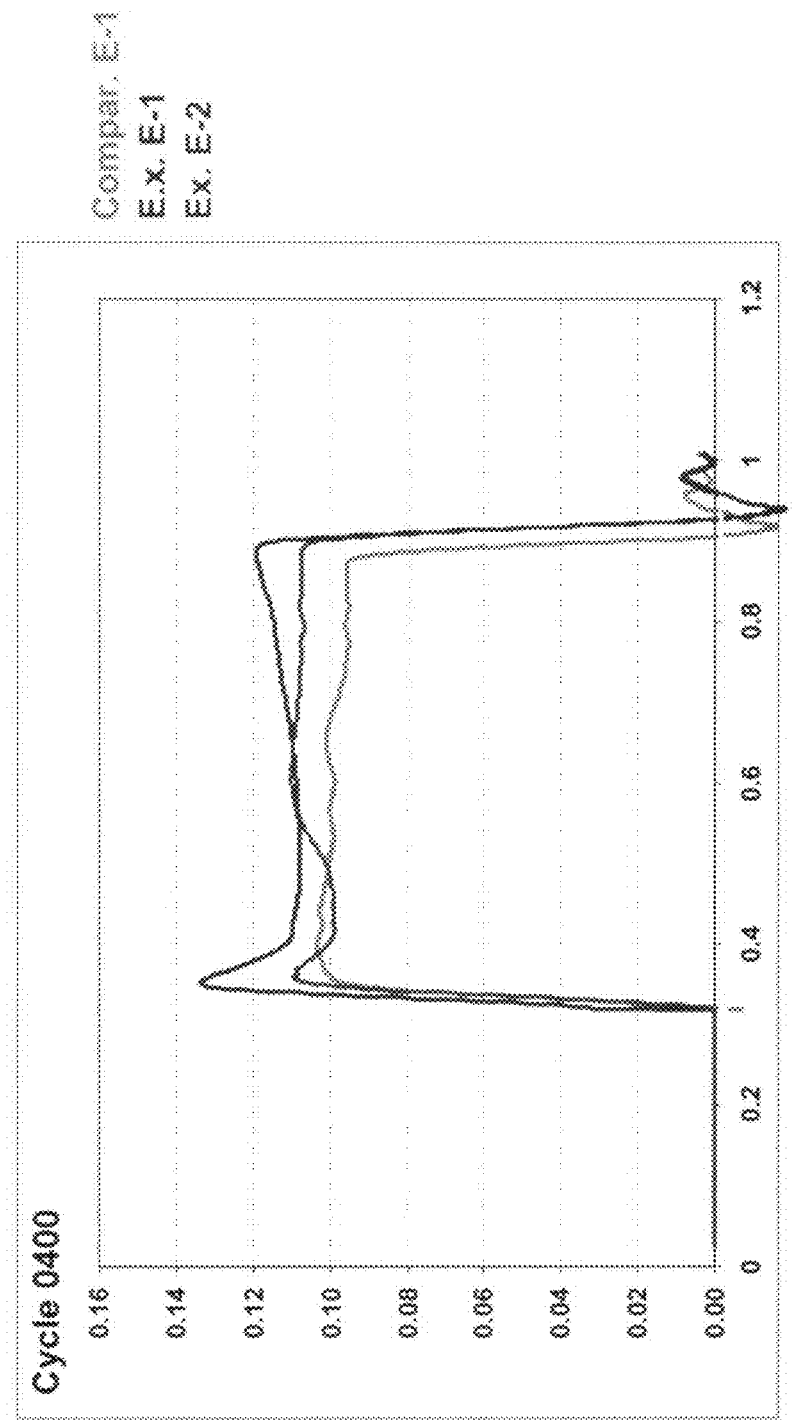
FIG. 19 is a T-N test data showing at the various cycles for Ex. 6-1 and 6-2 and Compar. E-1.

FIGS. 19a, b and c show T-N test data at 400 cycles. The petroleum pitch-based carbon fiber, when used as a secondary layer, either alone or in combination with silica filler materials, provide function materials that have improved durability.

Example VI

In yet another embodiment of the present invention, petroleum pitch-base carbon fibers (pp-carbon fiber) also improve the properties of a further commercial product, Compar. G, which is an extremely porous fibrous base material comprising about 80% fiber and about 20% filler which has a very open structure.

TABLE 4

| | Base Layer | Secondary Layer |
|---|---|---|
| Ex. 7-1 | Compar. G | 4 lb pp-carbon fiber |
| Ex. 7-2 | Compar. G | 9 lb pp-carbon fiber |
| Ex. 7-3 | Compar. G | 9 lb pp-carbon fiber and 12 lb 6μ ave. diameter celite filler |
| Ex. 7-4 | Compar. G | 9 lb pp-carbon fiber and 12 lb 6μ ave. diameter celite filler with latex addon |
| Compar. G | 20% filler 80% fiber | |

Figure 20A:
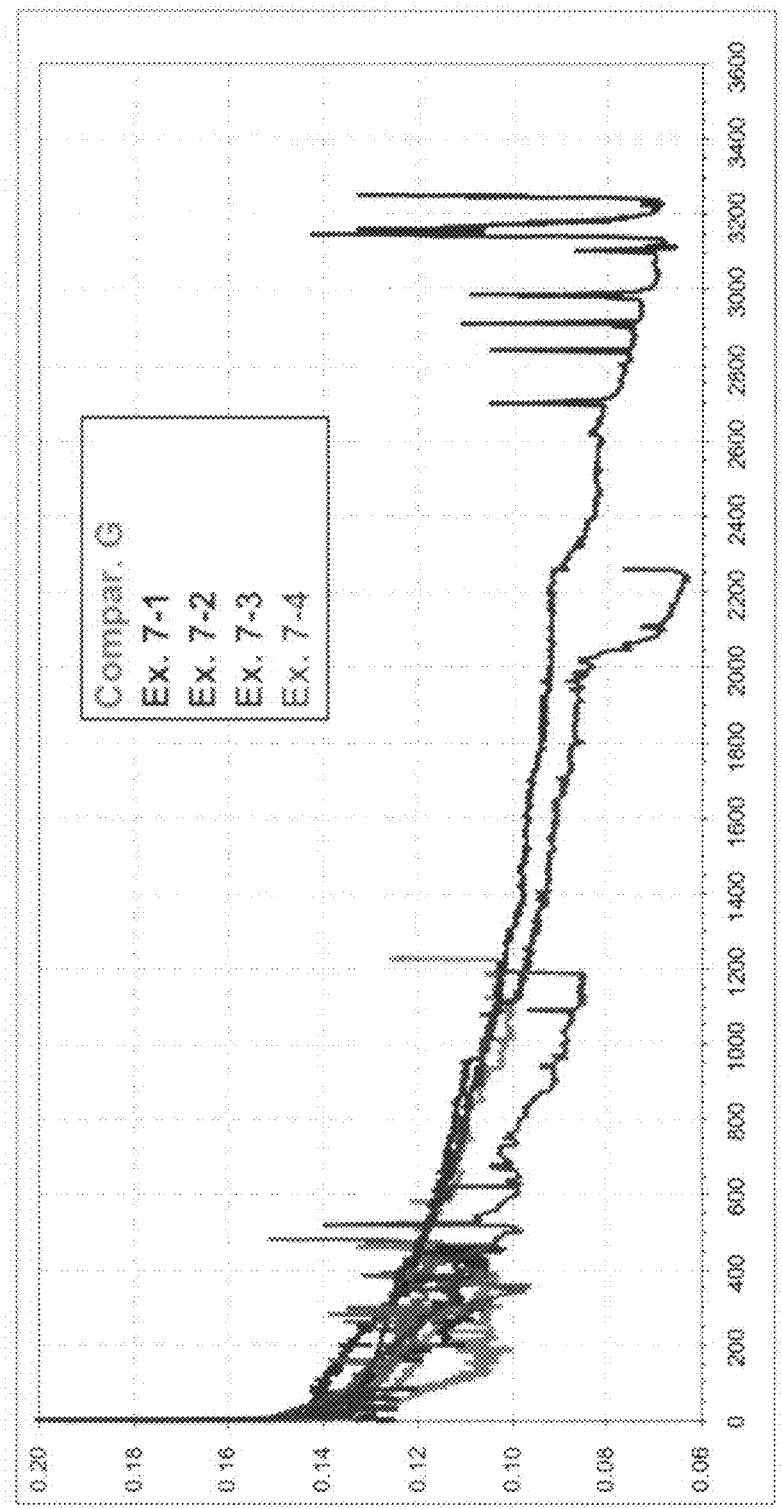
FIGS. 20a and 20b is a graph showing the T-N test data of Ex. 7-1, 7-2, 7-3 and 7-4 and Compar. 3.
Figure 20B:
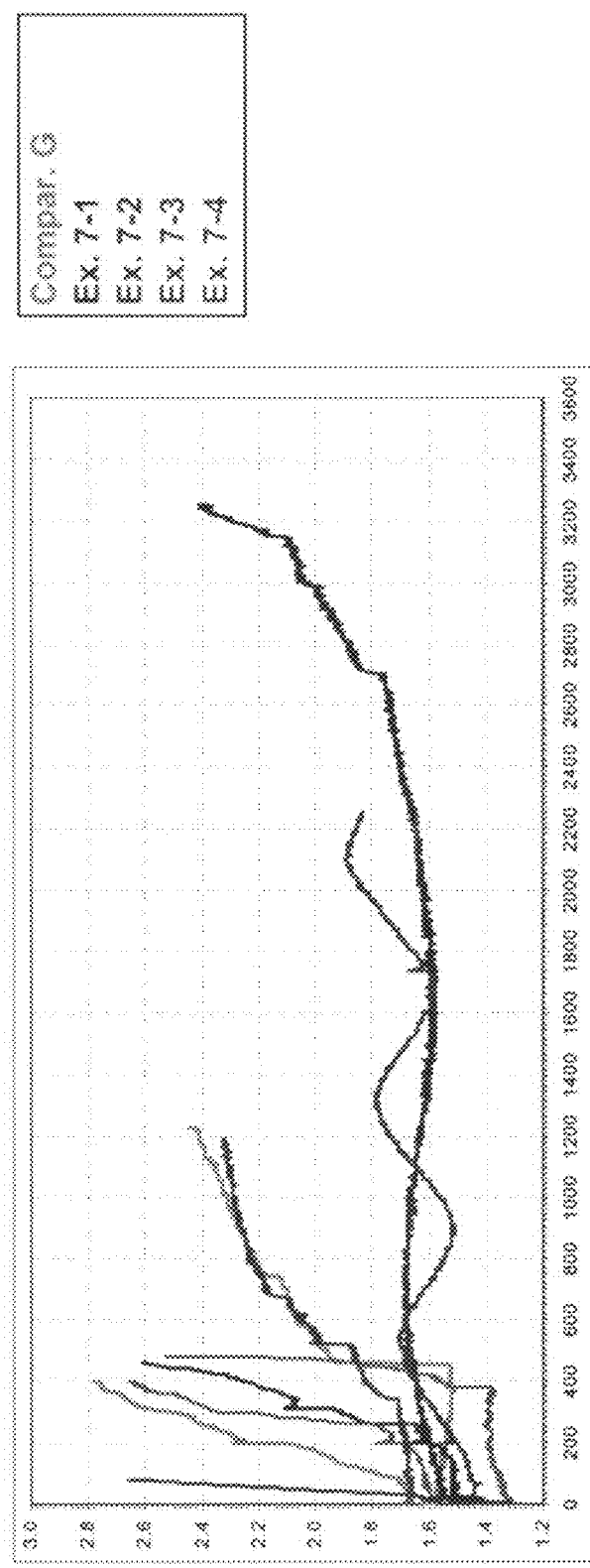

FIGS. 20a and 20b show for the T-N data for Compar. G and Ex. 7-1 to 7-4.

Ex. 7-1 with the 4 lbs. of the petroleum pitch-base carbon fiber deposit has a slightly higher the desirable coefficient of friction than the Compar. G base material alone. Further, the durability of the examples of the present invention was greatly increased.

Example VII

In yet another embodiment of the present invention, various formulations were made using mixed deposits, or secondary layers. A different commercial product H, comprises a fibrous base layer material which is also porous, and comprises about 80% fiber and about 20% filler and has an open structure.

The following examples were made:

TABLE 5

| | Base Layer | Secondary Layer |
|---|---|---|
| Compar. H-1 | Compar. H | 18 lb 6μ ave. diameter celite filler |
| Ex. 8-1 | Compar. H | 18 lb 6μ ave. diameter celite filler; 2 lb, 20 μm pp-carbon fiber |
| Ex. 8-2 | Compar. H | 9 lb 6μ ave. diameter celite filler; 2 lb 20 μm pp-carbon fiber |
| Ex. 8-3 | Compar. H | 9 lb 6μ ave. diameter celite filler; 2 lb 20 μm pp-carbon fiber |
| Ex. 8-4 | Compar. H | 2 lb 6μ ave. diameter celite filler; 2 lb 20 μm pp-carbon fiber |
| Compar. H-2 | Compar. H | 18 lb symmetrically shaped friction particles. |

Figure 21:
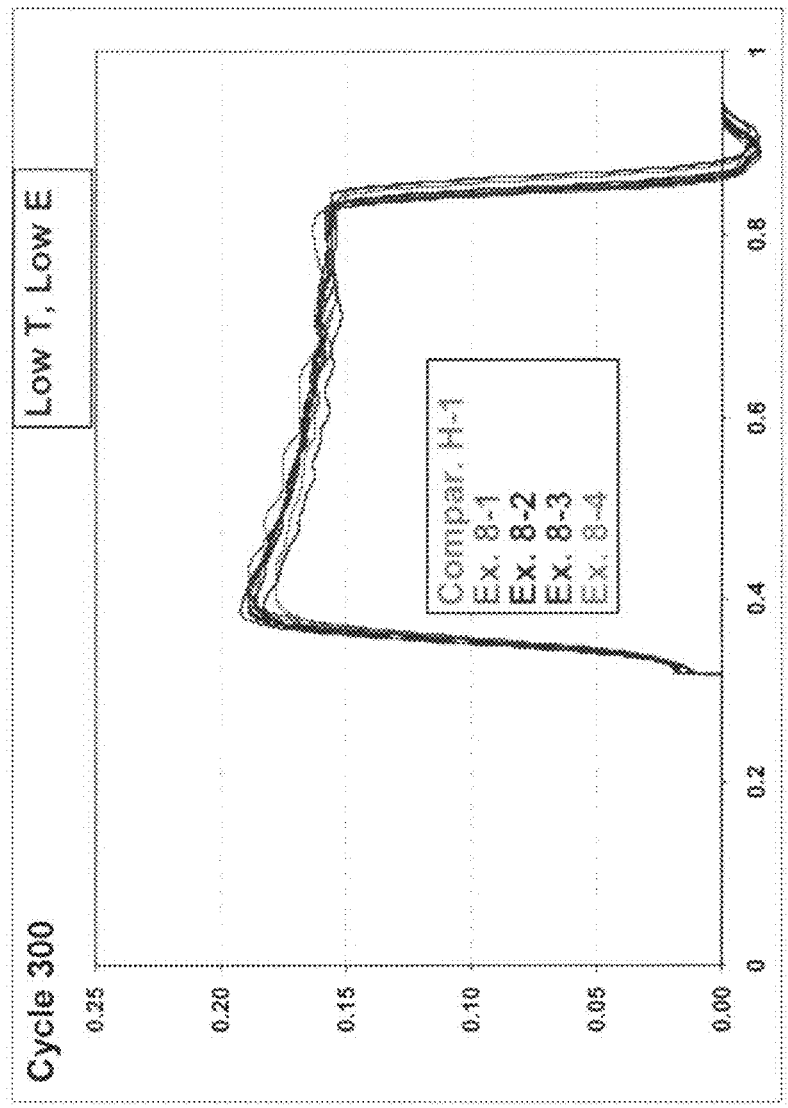
FIG. 21 is μVBPT test for Ex. 8-1, 82, 8-3, 8-4 and Compar. H-1.

FIG. 21 show that the friction materials with petroleum pitch-base carbon fiber have no detrimental effect on the μVPT tests and that the friction level remains the same; that is, FIG. 21 shows a positive downward slope with no undesirable rooster tail configuration.

Figure 22A:
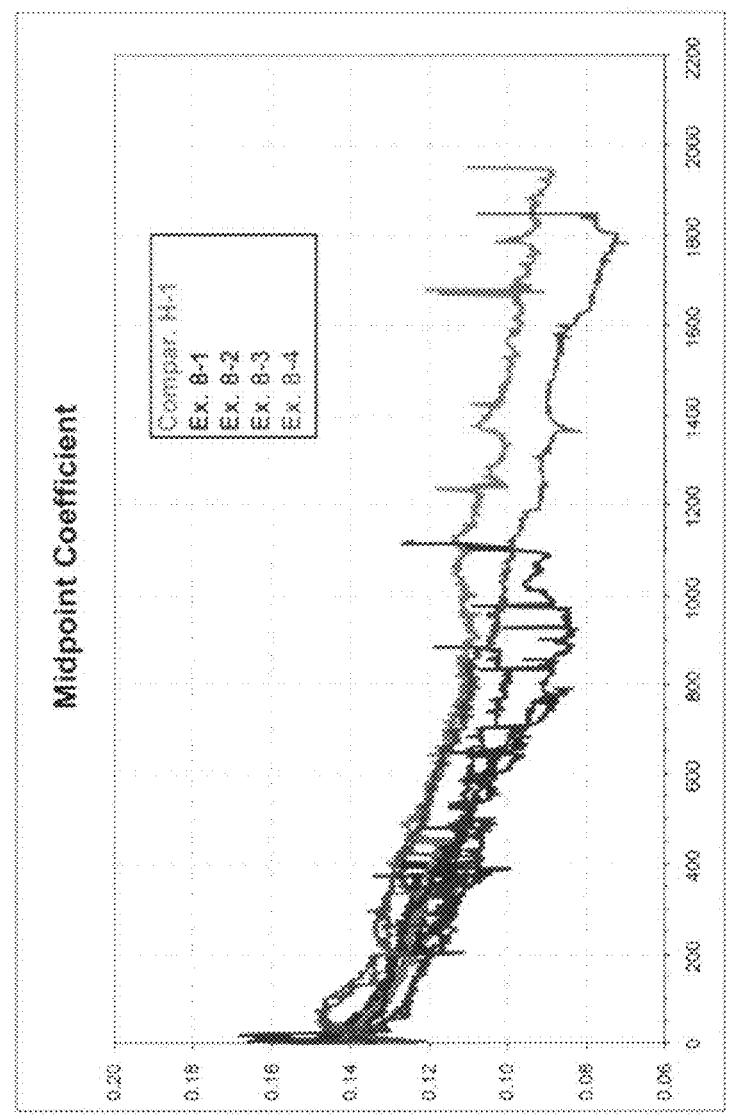
FIG. 22a is a graph showing the T-N data for the midpoint coefficient of friction for Ex. 8-1, 8-2, 8-3, 8-4 and Compar. H-1.

FIGS. 22a, 22b and 22c show the T-N test for low oil flow at 0.4 l/minutes. All samples showed similar coefficients of friction material. It is to be noted that Ex. 8-4 shows the best durability while Ex. 8-2 also showed excellent durability. These examples show that a small amount of the petroleum pitch-base carbon fiber material present as a secondary layer is sufficient to improve durability of the friction material.

The friction material of the present invention can be impregnated with various types of resin formulations. In the past, the following formulations have been found to be useful. However, it is to be understood that it is within the contemplated scope of the present invention that other resin formulations can be used in the present invention.

Various types of friction modifying particles are useful in the friction material. In one embodiment, useful friction modifying particles include silica particles. Other embodiments can have friction modifying particles such as resin powders such as phenolic resins, silicone resins epoxy resins and mixtures thereof. Still other embodiments can include partial and/or fully carbonized carbon powders and/or particles and mixtures thereof; and mixtures of such friction modifying particles. In certain embodiments, silica particles such as diatomaceous earth, Celite®, Celatom®, and/or silicon dioxide are especially useful. The silica particles are inexpensive inorganic materials which bond strongly to the base material. The silica particles provide high coefficients of friction to the friction material. The silica particles also provide the base material with a smooth friction surface and provide a good "shift feel" and friction characteristics to the friction material such that any "shudder" is minimized.

In certain embodiments, the friction material can be impregnated using different resin systems. In certain embodiments, it is useful to use at least one phenolic resin, at least one modified phenolic-based resin, at least one silicone resin, at least one modified silicone resin, at least one epoxy resin, at least one modified epoxy resin, and/or combinations of the above. In certain other embodiments, a silicone resin blended or mixed with a phenolic resin in compatible solvents is useful.

Various resins are useful in the present invention. In certain embodiments, the resin can comprise phenolic or phenolic based resins, preferably so that the saturant material comprises about 45 to about 65 parts, by weight, per 100 parts, by weight, of the friction material. After the resin mixture has been applied to the fibrous base material and the fibrous base material has been impregnated with the resin mixture, the impregnated fibrous base material is heated to a desired temperature for a predetermined length of time to form a friction material. In certain embodiments, the heating cures the phenolic resin present in the saturant at a temperature of about 300° F. When other resins are present in the saturant, such as a silicone resin, the heating cures the silicone resin at a temperature of about 400° F. Thereafter, the cured friction material is adhered to a desired substrate by suitable means.

Various useful resins include phenolic resins and phenolic-based resins. It is to be understood that various phenolic-based resins which include in the resin blend other modifying ingredients, such as epoxy, butadiene, silicone, tung oil, benzene, cashew nut oil and the like, are contemplated as being useful with the present invention. In the phenolic-modified resins, the phenolic resin is generally present at about 50% or greater by weight (excluding any solvents present) of the resin blend. However, it has been found that friction materials, in certain embodiments, can be improved when the mixture includes resin blend containing about 5 to about 80%, by weight, and for certain purposes, about 15 to about 55%, and in certain embodiments about 15 to about 25%, by weight, of silicone resin based on the weight of the silicone-phenolic mixture (excluding solvents and other processing acids).

Examples of useful phenolic and phenolic-silicone resins useful in the present invention are fully disclosed in the above-referenced BorgWarner U.S. patents which are fully incorporated herein, by reference. Silicone resins useful in the present invention include, for example, thermal curing silicone sealants and silicone rubbers. Various silicone resins are useful with the present invention. One resin, in particular, comprises xylene and acetylacetone (2,4-pentanedione). The silicone resin has a boiling point of about 362° F. (183° C.), vapor pressure at 68° F. mm, Hg: 21, vapor density (air=1) of 4.8, negligible solubility in water, specific gravity of about 1.09, percent volatile, by weight, 5% evaporation rate (ether=1), less than 0.1, flash point about 149° F. (65° C.) using the Pensky-Martens method. It is to be understood that other silicone resins can be utilized with the present invention. Other useful resin blends include, for example, a suitable phenolic resin comprises (% by wt.): about 55 to about 60% phenolic resin; about 20 to about 25% ethyl alcohol; about 10 to about 14% phenol; about 3 to about 4% methyl alcohol; about 0.3 to about 0.8% formaldehyde; and, about 10 to about 20% water. Another suitable phenolic-based resin comprises (% by wt.): about 50 to about 55% phenol/formaldehyde resin; about 0.5% formaldehyde; about 11% phenol; about 30 to about 35% isopropanol; and, about 1 to about 5% water.

It has also been found that another useful resin is an epoxy modified phenolic resin which contains about 5 to about 25 percent, by weight, and preferably about 10 to about 15 percent, by weight, of an epoxy compound with the remainder (excluding solvents and other processing aids) phenolic resin. The epoxy-phenolic resin compound provides, in certain embodiments, higher heat resistance to the friction material than the phenolic resin alone.

In certain embodiments, it is preferred that resin mixture comprises desired amounts of the resin and the friction modifying particles such that the target pick up of resin by the fibrous base material ranges from about 25 to about 70%, in other embodiments, from about 40 to about 65%, and, in certain embodiments, about 60 to at least 65%, by weight, total siliconephenolic resin. After the fibrous base material is saturated with the resin, the fibrous base material is cured for a period of time (in certain embodiments for about ½ hour) at temperatures ranging between 300-400° C. to cure the resin binder and form the friction material. The final thickness of the friction material depends on the initial thickness of the fibrous base material.

It further contemplated that other ingredients and processing aids known to be useful in both preparing resin blends and in preparing fibrous base materials can be included, and are within the contemplated scope of the present invention.

In certain embodiments, the resin mixture can comprise both the silicone resin and the phenolic resin which are present in solvents which are compatible to each other. These resins are mixed together (in preferred embodiments) to form a homogeneous blend and then used to saturate the fibrous base material. In certain embodiments, there is not the same effect if the fibrous base material is impregnated with a phenolic resin and then a silicone resin is added thereafter or vice versa. There is also a difference between a mixture of a silicone-phenolic resin solution, and emulsions of silicone resin powder and/or phenolic resin powder. When silicone resins and phenolic resins are in solution they are not cured at all. In contrast, the powder particles of silicone resins and phenolic resins are partially cured. The partial cure of the silicone resins and the phenolic resins inhibits a good saturation of the base material.

In certain embodiments of the present invention, the fibrous base material is impregnated with a blend of a silicone resin in a solvent which is compatible with the phenolic resin and its solvent. In one embodiment, isopropanol has been found to be an especially suitable solvent. It is to be understood, however, that various other suitable solvents, such as ethanol, methyl-ethyl ketone, butanol, isopropanol, toluene and the like, can be utilized in the practice of this invention. The presence of a silicone resin, when blended with a phenolic resin and used to saturate the fibrous base material, causes the resulting friction materials to be more elastic than fibrous base materials impregnated only with a phenolic resin. When pressures are applied to the silicone-phenolic resin blended impregnated friction material of the present invention, there is a more even distribution of pressure which, in turn, reduces the likelihood of uneven lining wear. After the silicone resin and phenolic resin are mixed together with the friction modifying particles, the mixture is used to impregnate the fibrous base material.

The friction material of the present invention includes a layer of friction modifying particles on a top surface of a fibrous base material provides a friction material with good anti-shudder characteristics, high resistance, high coefficient of friction, high durability, good wear resistance and improved break-in characteristics.

I claim:

1. A friction material for use in a fluid environment for engagement with an opposing friction surface comprising a fibrous base material including at least one type of petroleum pitch-based carbon fiber which is present on at least one outer surface of the friction material whereby the petroleum pitch-based carbon fiber is in contact with the opposing friction surface during the engagement of the friction material with the opposing friction surface wherein the friction material has a ratio of end point coefficient of friction (E) to midpoint coefficient of friction (M) of about 1 or less wherein the petroleum pitch-based carbon fiber comprises a solvated pitch which has a fluid temperature of at least about 40° C. lower than the melting point of the same pitch in the nonsolvated state wherein the petroleum pitch-based fibers do not melt when heated to carbonization temperatures.

2. The friction material of claim 1, wherein the petroleum pitch-based carbon fibers have from about 5 to about 40% solvent, by weight, wherein the pitch fiber is unmeltable upon removal of the solvent from the fiber.

3. The friction material of claim 1, wherein the petroleum pitch-based carbon fiber has an oxygen diffusion rate to a center of the fiber which is at least approximately equal to, or greater than, an oxygen rate at an outer surface of the fiber.

4. The friction material of claim 3, wherein the petroleum pitch-based carbon fibers have a softening point of at least about 300° C.

5. The friction material of claim 1, wherein the friction material comprising a fibrous base material comprising, by weight percent:
about 20 to about 60% fibrillated aramid fiber;
about 10 to about 30% silica filler;
about 10 to about 20% graphite; and
about 5 to about 20% petroleum pitch-based carbon fibers.

6. The friction material of claim 5, wherein the petroleum pitch-based carbon fiber comprises a solvated pitch which has a fluid temperature of at least about 40° C. lower than the melting point of the same pitch in the nonsolvated state wherein the petroleum pitch-based fibers do not melt when heated to carbonization temperature.

7. The friction material of claim 6, wherein the petroleum pitch-based carbon fibers have from about 5 to about 40% solvent, by weight, wherein the pitch fiber is unmeltable upon removal of the solvent from the fiber.

8. The friction material of claim 6, wherein the petroleum pitch-based carbon fiber has an oxygen diffusion rate to a center of the fiber which is at least approximately equal to, or greater than, an oxygen rate at an outer surface of the fiber.

9. The friction material of claim 8, wherein the petroleum pitch-based carbon fibers have a softening point of at least about 300° C.

10. A friction material comprising a fibrous base material comprising, by weight percent:
about 20 to about 40% fibrillated aramid fiber;
about 10 to about 30% silica filler;
about 10 to about 20% graphite;
about 5 to about 20% petroleum pitch-based carbon fibers, the petroleum pitch-based carbon fibers are present on at least one outer surface of the friction material wherein the friction material has a ratio of end point coefficient of friction (E) to midpoint coefficient of friction (M) of about 1 or less wherein the petroleum pitch-based carbon fiber is made from a solvated pitch which has a fluid temperature of at least about 40° C. lower than the melting point of the same pitch in the nonsolvated state wherein the petroleum pitch-based fibers do not melt when heated to carbonization temperatures.

11. The friction material of claim 10, wherein the petroleum pitch-based carbon fibers have from about 5 to about 40% solvent, by weight, wherein the pitch fiber is unmeltable upon removal of the solvent from the fiber.

12. The friction material of claim 10, wherein the petroleum pitch-based carbon fiber has an oxygen diffusion rate to a center of the fiber which is approximately equal to, or greater than, an oxygen rate at an outer surface of the fiber.

13. The friction material of claim 12, wherein the petroleum pitch-based carbon fibers have a softening point of at least about 300° C.

14. A friction material comprising a fibrous base material comprising, by weight percent:
about 50 to about 60% aramid fibers;
about 3 to about 10% silica filler;
about 20 to about 30% graphite; and
about 10 to about 20% petroleum pitch-based carbon fibers, the petroleum pitch-based carbon fibers are present on at least one outer surface of the friction material wherein the friction material has a ratio of end point coefficient of friction (E) to midpoint coefficient of friction (M) of about 1 or less wherein the petroleum pitch-based carbon fiber is made from a solvated pitch which has a fluid temperature of at least about 40° C. lower than the melting point of the same pitch in the nonsolvated state wherein the petroleum pitch-based fibers do not melt when heated to carbonization temperatures.

15. The friction material of claim 14, wherein the petroleum pitch-based carbon fibers have from about 5 to about 40% solvent, by weight, wherein the pitch fiber is unmeltable upon removal of the solvent from the fiber.

16. The friction material of claim 14, wherein the petroleum pitch-based carbon fiber has an oxygen diffusion rate to a center of the fiber which is approximately equal to, or greater than an oxygen rate at an outer surface of the fiber.

17. The friction material of claim 16, wherein the petroleum pitch-based carbon fibers have a softening point of at least about 300° C.

18. A friction material comprising a fibrous base material comprising:
about 50 to about 70% silica friction modifying material and about 30 to about 50% fibers, wherein the fibers comprise aramid fibers and petroleum pitch-based carbon fibers, the petroleum pitch-based carbon fibers are present on at least one outer surface of the friction material wherein the friction material has a ratio of end point coefficient of friction (E) to midpoint coefficient of friction (M) of about 1 or less wherein the petroleum pitch-based carbon fibers have from about 5 to about 40% solvent, by weight, wherein the pitch fiber is unmeltable upon removal of the solvent from the fiber.

19. The friction material of claim 18, wherein the petroleum pitch-based carbon fibers are present from about 5 to about 50% based on amount of the fibers present in the friction material.

20. The friction material of claim 19, wherein the petroleum pitch-based carbon fibers are present at about 45 to about 55% based on amount of the fibers present in the friction material.

21. The friction material of claim 19, wherein the petroleum pitch-based carbon fibers are present at about 30 to about 40% based on amount of the fibers present in the friction material.

22. The friction material of claim 19, wherein the petroleum pitch-based carbon fibers are present at about 10 to about 20% based on amount of the fibers present in the friction material.

23. The friction material of claim 19, wherein the petroleum pitch-based carbon fibers are present at about 3 to about 7% based on amount of the fibers present in the friction material.

24. The friction material of claim 19, wherein the petroleum pitch-based carbon fibers have from about 5 to about 40% solvent, by weight, wherein the pitch fiber is unmeltable upon removal of the solvent from the fiber.

25. The friction material of claim 19, wherein the petroleum pitch-based carbon fiber has an oxygen diffusion rate to a center of the fiber which is approximately equal to, or greater than an oxygen rate at an outer surface of the fiber.

26. The friction material of claim 19, wherein the petroleum pitch-based carbon fibers have a softening point of at least about 300° C.

* * * * *

UNITED STATES PATENT AND TRADEMARK OFFICE
CERTIFICATE OF CORRECTION

PATENT NO. : 7,537,824 B2  Page 1 of 1
APPLICATION NO. : 10/280101
DATED : May 26, 2009
INVENTOR(S) : Feng Dong It is certified that error appears in the above-identified patent and that said Letters Patent is hereby corrected as shown below:

Cover Page, item (73) Assignee, delete "," to read "BorgWarner Inc.,"

Column 3, line 66 after "cross-section" delete "f" and insert --of--

Column 4, line 26 after "Ex. 8-1," delete "82" and insert --8-2--

Column 4, line 56 after "40%" delete "solvant" and insert --solvent--

Column 8, line 58 after "samples" insert --with--

Column 11, line 58 after "higher" delete "the" and insert --than--

Column 12, line 42 after "silicone resins" insert --,--

Signed and Sealed this

Sixth Day of October, 2009

David J. Kappos
*Director of the United States Patent and Trademark Office*